(12) United States Patent
Fliess et al.

(10) Patent No.: US 9,904,298 B2
(45) Date of Patent: Feb. 27, 2018

(54) METERING VALVE AND METERING METHOD

(71) Applicant: VERMES MICRODISPENSING GMBH, Otterfing (DE)

(72) Inventors: Mario Fliess, Munich (DE); Juergen Staedtler, Feldkirchen-Westerham (DE)

(73) Assignee: VERMES MICRODISPENSING GMBH, Otterfing (DE)

( * ) Notice: Subject to any disclaimer, the term of this patent is extended or adjusted under 35 U.S.C. 154(b) by 0 days.

(21) Appl. No.: 14/771,454

(22) PCT Filed: Mar. 13, 2014

(86) PCT No.: PCT/EP2014/054990
§ 371 (c)(1),
(2) Date: Aug. 28, 2015

(87) PCT Pub. No.: WO2014/140195
PCT Pub. Date: Sep. 18, 2014

(65) Prior Publication Data
US 2016/0004257 A1    Jan. 7, 2016

(30) Foreign Application Priority Data

Mar. 15, 2013  (DE) ........................ 10 2013 102 693

(51) Int. Cl.
*F16K 31/00*     (2006.01)
*G05D 7/06*     (2006.01)
(Continued)

(52) U.S. Cl.
CPC .......... *G05D 7/0635* (2013.01); *B05C 5/0225* (2013.01); *F16K 11/04* (2013.01);
(Continued)

(58) Field of Classification Search
CPC ... G05D 7/0635; F16K 31/004; F16K 31/007; F16K 11/04; F16K 49/005; F16K 17/00; F16K 51/00; F16K 31/02; B05C 5/0225
(Continued)

(56) References Cited

U.S. PATENT DOCUMENTS 4,284,263 A * 8/1981 Newcomb .......... F02M 51/0603
137/468
4,669,660 A   6/1987 Weber et al.
(Continued)

FOREIGN PATENT DOCUMENTS

AU      7225994 A    2/1995
CN      1437428 A    8/2003
(Continued)

OTHER PUBLICATIONS

International Search Report for PCT/EP2014/054990 dated May 19, 2014.
(Continued)

*Primary Examiner* — Ian Paquette
(74) *Attorney, Agent, or Firm* — Studebaker & Brackett PC

(57) ABSTRACT

The invention discloses a metering valve for metering a metering material, having a valve chamber comprising an outlet aperture, a closure element arranged in or on to the valve chamber, a valve chamber casing and an actuator assembly realized to move at least the outlet aperture, preferably the valve chamber, relative to the valve chamber casing in an ejection direction and/or a retraction direction during operation such that, in at least one movement mode, metering material is expelled by the closure element through the outlet aperture by a movement of the outlet aperture in
(Continued)

the ejection direction. The invention further discloses a metering method which can be performed by means of such a metering valve.

17 Claims, 10 Drawing Sheets

(51) Int. Cl.
*B05C 5/02* (2006.01)
*F16K 51/00* (2006.01)
*F16K 17/00* (2006.01)
*F16K 11/04* (2006.01)
*F16K 49/00* (2006.01)

(52) U.S. Cl.
CPC ............ *F16K 17/00* (2013.01); *F16K 31/004* (2013.01); *F16K 49/005* (2013.01); *F16K 51/00* (2013.01)

(58) Field of Classification Search
USPC ................ 251/129.06, 129.01; 239/102.2
See application file for complete search history.

(56) References Cited

U.S. PATENT DOCUMENTS

| | | | |
|---|---|---|---|
| 6,552,472 B1 | 4/2003 | Heinz | |
| 7,644,875 B2* | 1/2010 | Mochizuki | F02M 51/0603 123/470 |
| 8,100,346 B2* | 1/2012 | Venkataraghavan | H01L 41/0536 239/102.1 |
| 8,678,299 B2* | 3/2014 | Ham | B05B 17/0607 239/101 |
| 8,684,286 B2 | 4/2014 | Hannich | |
| 2003/0152658 A1 | 8/2003 | Ogino et al. | |
| 2014/0291358 A1 | 10/2014 | Fliess et al. | |

FOREIGN PATENT DOCUMENTS

| | | |
|---|---|---|
| CN | 101628272 A | 1/2010 |
| CN | 201482677 U | 5/2010 |
| DE | 43 25 143 C1 | 12/1994 |
| DE | 10 2005 011 043 A1 | 9/2006 |
| DE | 10 2008 035 087 A1 | 2/2010 |
| DE | 102011108799 A1 | 1/2013 |
| EP | 1 053 424 B1 | 8/2004 |
| WO | 99/064167 A1 | 12/1999 |
| WO | 2013/017368 A1 | 2/2013 |

OTHER PUBLICATIONS

The First Office Action issued by the State Intellectual Property Office of the People's Republic of China dated Sep. 1, 2016, which corresponds to Chinese Patent Application No. 201480015617.9 and is related to U.S. Appl. No. 14/771,454; with English language translation.

* cited by examiner

G - G

C - C

F - F

B - B

METERING VALVE AND METERING METHOD

The invention describes a metering valve with a valve chamber that comprises an outlet aperture, a closure element arranged in or on the valve chamber, and an actuator assembly. The invention further describes a method of metering a substance.

The metering of liquid to viscous substances or materials such as adhesives, paints, printing varnishes, conductive substances such as solder paste bound in a binding agent, converter materials for LEDs (generally viscous pastes with a high filler content, in particular ceramic fillers), etc., serves to precisely apply such substances onto target surfaces. For example, conductive substances can be applied precisely and accurately onto electronic circuit boards, replacing relatively inflexible procedures such as masking and using a doctor blade. A particular challenge lies in applying the substances very precisely, i.e. at the right time, in the right place, and in an exactly metered quantity, to the target surface. This can be achieved, for example, by a drop-by-drop release through the nozzle of a metering system, whereby the size and/or number of the droplets are previously determined as accurately as possible by the action of the nozzle. Alternatively, the substance can be sputtered in a jet, or sprayed in a mist.

A prior art metering valve of the type described above comprises an actuator assembly which moves the closure element in an ejection direction and a retraction direction during operation. Usually, an elongated plunger is implemented as closure element to completely close the outlet opening of the metering valve nozzle when moved in the ejection direction. When the plunger is moved in the ejection direction, it expels material through the outlet opening.

U.S. Pat. No. 7,767,266 B2 indicates an alternative to such a sealing off of the outlet aperture with a closure element. This document describes a metering valve that is realized as an open system: a metering screw is used to feed a substance in the direction of an outlet aperture of a nozzle, thereby passing alongside a plunger in an aperture gap, before entering a collection cavity that can be compressed by the plunger. Such an open system is characterized in that the substance can theoretically flow unchecked in the direction of the outlet aperture, and only its viscosity prevents it from doing so. Here, the aperture gap must be sufficiently large. The open realization of the metering apparatus also means that outflow of the substance is effected by actuating the metering screw and applying an extremely high pressure, since the high viscosity of the substance could otherwise prevent its outflow. Such a metering screw poses an additional component compared to closed systems; but more significantly, the metering apparatus must be designed to withstand the high pressures, resulting in considerably higher material costs. Even so, increased wear and tear of the materials and liability to fail cannot be prevented on account of the high pressures, even when high-grade and reinforced materials are used.

There are other kinds of nozzle for spraying liquid media, for example paints onto a target surface, wherein the medium is pressurized with compressed air and forced through a nozzle. An example of such a nozzle is disclosed in DE 10 2005 011 043 A1. To set the metering rate for a certain pressure, the tip of a needle extends into the outlet cross-section of the nozzle, and the position of the nozzle is adjustable relative to the needle in order to adjust the clearance of the outlet cross-section to a specific task. This allows setting of the thickness of the medium sprayed onto the target surface. Such a nozzle is suitable for paint spray guns, but not for high-precision metering, specifically not for drop-wise metering.

Precision metering presents a particularly great challenge when the substance is not a liquid substance with a consistency similar to that of water, but is a relatively viscous medium instead. Examples of such substances are highly enriched adhesives, heavily pigmented paints, or varnishes comprising a large proportion of pigment, etc. Metering of a substance with a (high) proportion of polymers, in particular long-chain polymers is particularly complicated. The usually high viscosity of all these substances generally means that very high pressures are necessary in order to meter the substance precisely and accurately from the nozzle of a metering system of the type described above. Such high pressures are generally difficult to achieve and maintain, particularly since any seals and other sensitive components of the metering system must be appropriately constructed to withstand pressure. The metering material pressure is also limited by the fact that the pressure accelerates the substance in the direction of the target surface. An impact velocity that is too high at the target surface on account of an excessively high acceleration leads to a worsening of the final result, namely increased blurring of the substance applied on the target surface.

Generally, a liquid to viscous substance covers any liquid material or material mixture that has fluid properties. The definition of viscosity can extend from a viscosity greater than that of water to a viscosity that approaches the properties of a solid. In particular, viscous substances are those with thixotropic or shear-thinning properties. This means that the viscosity of the substance is higher in a resting state than in an agitated state, and upon returning to a resting state, its viscosity at least approaches the original higher viscosity (after a certain resting time, as the case may be). The term "viscous" may also apply to a material or medium that has the characteristics of a solid in a resting state, and which is only capable of flowing when agitated.

In order to meter the substance very precisely, it is very important to achieve a precisely defined detachment or tear-off of the substance at the nozzle of the metering valve, so that the amount of substance that is given off corresponds as precisely as possible to a previously defined amount, and so that subsequently—after closing the metering valve—no further substance leaves the nozzle. In other words, the closure mechanism of the metering valve should close particularly quickly and effectively in order to ensure a practically instantaneous detachment of the substance at the end of a metering step. The "end of a metering step" can be defined as an (intermittent) interruption of a stream of material, or the completion of metering a droplet of material before metering the next droplet.

The instantaneous detachment of material at the nozzle, i.e. the nozzle opening, is particularly difficult to achieve when the substance exhibits pronounced polymeric properties. Typically, the portion of substance that has already left the nozzle opening is still attached by a relatively strong thread to the rest of the substance in the nozzle. It is precisely this thread which must be detached at the conclusion of a metering action.

It is an object of the invention to provide an alternative way of achieving an effective closing or opening of a metering valve of the type described above. The alternative should particularly preferably allow a very precise detachment of the expelled substance. Focus is preferably placed on a more effective, i.e. more precise metering of viscous substance, particularly thixotropic and/or shear-thinning substances.

The object is achieved by the metering valve of claim 1 and by the method of claim 14 of metering a substance.

A metering valve according to the invention comprises an actuator assembly realized to move the outlet aperture, and thereby preferably at least parts or regions of the valve chamber comprising the outlet aperture, preferably the entire valve chamber, relative to the valve chamber casing in an ejection direction and/or a retraction direction during operation such that, in at least one movement mode (or in at least one mode of operation), substance is ejected by the plunger through the outlet aperture by a movement of the outlet aperture in the ejection direction. To this end, the actuator assembly is realized ant positioned to directly and/or indirectly move the outlet aperture. As will be explained below, the metering valve can be realized or can be controlled by a suitable control unit to be operated in various movement modes or modes of operation. Thereby, at least in one mode of operation, the relative motion between plunger and outlet aperture is used to expel, in each movement in the ejection direction, a precisely determined (i.e. metered) amount of substance as quickly as possible out through the outlet aperture. The advantages of the method can be appreciated particularly in the case of high-precision metering valves, for which a rapid relative motion between plunger and outlet aperture is desirable.

The invention departs from the concept of moving only the closure element in the ejection or retraction direction, and instead entirely or partially replaces that motion of the closure element by a motion of the outlet aperture, preferably by a motion of at least a part or region of the valve chamber. The valve chamber is a cavity, which is preferably defined or formed by a valve chamber element inside which the cavity extends, and which defines the dimensions and arrangement of the cavity (i.e. its position and/or orientation). The valve chamber element is to be understood as part of the valve chamber, and the expressions "valve chamber" and "valve chamber element" may be used interchangeably in the following. The valve chamber element can function in this context as a mechanical coupling element that transfers the movements of the actuator assembly and the forces exerted by the actuator assembly to result in the desired movement of the outlet aperture in the ejection/retraction direction. In the method according to the invention, the interior dimensions (height or volume) of the valve chamber become larger or smaller during operation of the actuator, depending on the direction of movement.

The outlet aperture is defined as a cylindrical or (conically) tapered channel, leading from the interior of the metering valve to the exterior of the metering valve. The outlet aperture is bounded thereby on the one side by the interior of the metering valve or metering valve chamber, and on the other side by its exterior surroundings, and is also defined by an enclosing nozzle/cover arrangement which defines the outlet aperture channel and which may be regarded as part of the valve chamber. The surface of this nozzle/cover arrangement towards the outlet aperture channel is defined as belonging to the outlet aperture, so that the position and movement of the outlet aperture result from the position or movement of the nozzle/cover arrangement.

As in the prior art, the closure element and the outlet aperture are moved relatively towards each other or away from one another; however this relative movement is at least no longer performed exclusively by the closure element, instead it is performed at least partially, or even entirely, by the outlet aperture.

The movement of the outlet aperture with the aid of the actuator assembly initially achieves the same effect as in the prior art described above, i.e. a change in relative position between closure element and outlet aperture. This can achieve an opening/closing movement of the metering valve in a closed system, in which case a closing movement will be a movement in the ejection direction, i.e. substance is ejected, after which the valve is closed. The invention can preferably serve to increase the effectiveness of the closure of the metering valve. In this case, and also in the case of an open system, a decrease or increase of the possible substance through-flow can arise from the exact definition of the ejection and retraction directions.

In the first case, the movement of the outlet aperture in the direction of the closure element acts against the direction of flow of the substance, which after all is expelled, or at least assisted by, the closure element through the outlet aperture to the outside, i.e. from the direction of the interior of the metering valve and away from the closure element. This substance can be abruptly detached at the end with a purposeful counter-movement. In this case, the invention makes use of the fact that the material stream moves out of the outlet aperture in a certain predetermined flow direction. A counter-movement against this flow direction is effected by the outlet aperture, for example by the valve chamber or the parts thereof that form the outlet aperture, resulting in a sudden and abrupt interruption of the stream of material, resulting in a clearly defined detaching of the stream. Particularly in the case of shear-thinning or thixotropic substances, this abrupt detachment or the deliberate counter-movement of the outlet aperture against the flow direction interrupts the flow of material more clearly than is the case in the prior art.

The "closure mechanism" may be understood in an essentially similar way, also in the case of an open system, but in this case the through-flow of material is not interrupted by a complete closure of the outlet aperture, instead, depending on the viscosity of the substance, a further ejection of material is prevented or the material flow is curbed by reducing the aperture gap.

In this context, two categories of material (i.e. media or substances) can be metered particularly effectively and with high precision: on the one hand solder pastes or conductive adhesives, i.e. media that are generally filled with soft particles; and on the other hand silicone- or epoxy-based adhesives, i.e. media that are filled with very hard or abrasive particles and which can be used for heat transfer, for electrical insulation or for optical interference of light. These substances have been difficult to meter up until now, but excellent and highly-precise metering results have been achieved using the metering valve according to the invention. For these reasons, even though more elements or a larger part of the metering valve must be moved in comparison to the prior art, the metering valve according to the invention achieves a surprising improvement in effectiveness.

Preferably, the valve chamber comprises a nozzle with the outlet aperture. The closure element is particularly preferably arranged in the valve chamber such that the outlet aperture moves in the direction of the closure element during movement (particularly movement of the valve chamber) in the ejection direction, whereby material is expelled from the nozzle by the closure element; and the outlet aperture moves away from the closure element during a movement in the retraction direction. As mentioned above, in a movement in the retraction direction, the outlet aperture can be moved as far as the closure element, with the aid of which the outlet aperture is automatically completely closed at the end of the movement in this direction, or the gap between closure element and outlet aperture is so small, that a viscous substance cannot pass through.

The actuator assembly can comprise one or more actuators. The one or more actuators are preferably coupled to the valve chamber or the parts thereof that form the outlet aperture, and to the valve chamber casing.

The valve chamber casing can be a valve housing, i.e. an essentially closed container, or it can simply comprise a frame inside which the valve chamber and the actuator assembly are arranged.

The closure element can be understood to be a one-piece or multi-piece element that preferably comprises an elongated shape, for example a cylindrical shape, for example a plunger, made for example using silicon. Equally, the closure element may be round or oval, arranged movably or stationary in the closure channel. The closure element can be arranged in a closure channel, i.e. a hollow body, preferably a cylindrical hollow body that defines or encloses a cavity on its inside, within which the closure element is at least partially arranged such that the closure element closes the cavity.

It should be noted in the context of the invention that the closing action can be complex and does not necessarily involve a complete sealing of the cavity by the closure element: the metering valve according to the invention can also be an open system, which is preferable specifically for the metering of shear-thinning or thixotropic substances as described above.

For such an open system, the mutual operation of the closure element and the outlet aperture or outlet channel (which is basically an extension of the outlet aperture into the valve chamber and which in this case is moved together with the outlet aperture) is decisive: a sufficiently large aperture gap through which the material can pass should be defined at least in places between the closure element and the outlet aperture. This aperture gap forms an outlet channel for the substance. In a suitably agitated state, the substance can flow through the outlet channel. In contrast, during a non-agitated state or in a movement mode or motion pattern in which the viscosity is only slightly lowered, the substance is preferably retained in the outlet channel defined by the aperture gap without flowing any further. This means that the dimensions of the outlet gap or outlet channel are chosen such that, under the applicable pressure conditions of the substance in the metering valve, and at a normal operating temperature, no flow or essentially no flow is ensured as soon as the substance is no longer in motion or is moving only slightly. In this context, the closure element and its associated aperture channel act jointly against the substance, which is held back by this joint action. Ultimately, such a closure is formed in that an open arrangement is provided in principle, through which the substance can pass relatively unhindered when in a suitably agitated state, but which automatically closes on account of the thixotropic or shear-thinning properties of the substance upon cessation of the relative movement between the closure channel and closure element. This relative movement is caused by moving the outlet aperture or closure channel. Material flow therefore does not take place during a complete resting state of the closure channel relative to the closure element. It is not necessary to completely seal the outlet aperture; in fact it is preferable to always leave the outlet aperture open. Furthermore, a deliberate metering of material can be controlled by means of the various movement modes, as will be explained below.

A metering method according to the invention is analogous to the inventive metering valve, and is a method of metering a substance by means of a metering valve that comprises an outlet aperture and a closure element arranged in or on the valve chamber, whereby the outlet aperture, and part of the valve chamber comprising the outlet aperture if applicable, preferably the entire valve chamber, is moved during operation relative to a valve chamber casing in an ejection and/or retraction direction so that, in at least one movement mode, a specific amount of material is expelled by the plunger through the outlet aperture by a movement of the outlet aperture in the ejection direction. Thereby, the outlet aperture is preferably moved by an actuator assembly relative to the valve chamber casing.

Other particularly advantageous embodiments and modifications of the invention will become apparent from the dependent claims and the following description. The metering method can be further developed using features of the dependent claims relating to the dv and as outlined in the following description, and vice versa. Features of the various embodiments can be combined in any manner to give further embodiments within the scope of the invention.

Preferably, the ejection direction and the retraction direction of the outlet aperture lie along, i.e. are parallel to or preferably coaxial with an effective direction axis of the actuator assembly.

The effective direction axis of an actuator or actuator assembly is to be understood as the (imaginary) axis along which the actuator or actuator assembly as a whole has its main extension direction and in which it exerts the desired pressure or performs as a force applying element. A parallel alignment, in particular a coaxial alignment, of the effective direction axes of the actuator assembly and the ejection or retraction directions of the outlet aperture results in particularly low active power losses, i.e. loss in force, being observed in the movement of the outlet aperture. This increases the precision of the outlet aperture on the one hand, and the possible speed of the outlet aperture member on the other hand and therefore increases the overall efficiency of the metering valve.

In a particularly preferred embodiment of the invention, the effective direction axes of several actuators result in a single effective direction axis. To this end, a first actuator and a second actuator may be arranged for example one behind the other along the effective direction axis. In a particularly preferred embodiment, the ejection direction or retraction direction of the outlet aperture then lies along this common effective direction axis of the actuators of the actuator assembly. In general, multiple actuators of an actuator assembly can be arranged to work in parallel with, or co-axial to each other. This measure also achieves an optimal transfer of forces, since the forces exerted by the actuators of an actuator assembly at any one instant can essentially be accumulated. Furthermore, this measure increases the running smoothness of the metering valve since there is no need to compensate for forces acting laterally to the effective direction axis of an actuator assembly.

Such a co-action of two "series-connected" actuators can serve, for example, to lengthen the closing or opening action i.e. the stroke of the outlet aperture. The ejection/retraction direction of the outlet aperture can lie coaxial to the effective direction axis of such piezo-electric actuators, e.g. in the case of an annular realization of piezoelectric actuators (as will be explained below), or parallel to the effective direction axis when the actuators are realized in a different fashion. The parallel and/or coaxial alignment of the effective direction axes of the actuators and the ejection/retraction directions of the outlet aperture result in very low active power losses in the movement of the outlet aperture. This increases the precision of the outlet aperture on the one hand, and the speed of the outlet aperture on the other hand and therefore increases the overall effectiveness of the metering valve.

The co-action of the two actuators can on the one hand—and this is the particularly preferred approach—follow the principle that the first actuator moves the outlet aperture in a first direction, namely in the ejection direction, and the second actuator moves it in a second, opposite direction, namely in the retraction direction (or vice versa). The first and second actuators are therefore oppositely directed as regards their movements, and are preferably switched oppositely. In the context of the invention, this can be realized with any kind of actuator, but particularly preferably with piezoelectric actuators for reasons of simplicity, as will be explained in more detail below.

It is in principle possible that both the closure element and the outlet aperture are arranged to be movable during operation of the metering valve. With such a measure, for instance, in one operation state the closure element could moved in the direction of outflow of the substance while the outlet aperture could be moved in the opposite direction in order to achieve a higher relative speed between these two elements. In this case, the velocity contribution of the closure element can essentially be added to the velocity contribution of the outlet aperture to arrive at their relative velocity. In another mode of operation, both of these elements can be moved apart, i.e. the closure element is moved against the flow direction of the substance, and the outlet aperture is moved in the flow direction. This measure can achieve a more rapid closure or a quicker opening of the metering valve.

The closure element can be movably arranged in the metering valve for other reasons: for example the closure element may be moved when the outlet aperture is at an extreme position, or specifically only then. In particular, when the outlet aperture has been moved completely in the direction of the metering valve interior, the closure element can thus be moved further in the direction of the outlet aperture in order to completely physically close the outlet aperture. In this way, even in the case of an open system as described above, a complete mechanical closure effect can be achieved. The physical closure protects the substance from deterioration, specifically on account of the ambient environment (for example due to evaporation) and/or facilitates the filling (particularly a first filling) or the cleaning of the metering valve.

Generally, a movable closure element can for example be arranged to move to and fro between two defined stops, so that a defined maximum stroke of the closure element ensues. A stop position of the closure element can be achieved by a tension spring in an unloaded state. It is also possible to move the closure element (in a controlled manner) in various intermediate positions, for example with the aid of a spindle. To drive the closure element, it is also possible to use electrically driven (spindle) systems, lifting solenoids, pneumatic and/or hydraulic pistons, etc. It is also possible to set the position of the closure element by hand, for example by screwing in the closure element. Such a position setting can also serve to adjust the metering valve, particularly its outlet passages in the direction of the outlet aperture, to the respective substance and particularly to the viscosity thereof.

Preferably, the closure element is fixedly secured to the valve chamber casing. Fixing it to the valve chamber casing can be done directly, which means that the closure element is directly connected to the valve chamber casing, or can be done indirectly, i.e. one or more connecting elements can be attached between the valve chamber casing and the closure elements, which result in the fixation of the closure element to the valve chamber casing. Connecting or fixing the closure element to the valve chamber casing ensures that the closure element cannot be moved, in contrast to the prior art, which means that the ejection and retraction movements of the metering valve are achieved solely by the movement of the outlet aperture.

Such a construction based on a stationary closure element has the advantage (compared to a metering valve with a movable outlet aperture and a movable closure element) that the construction of the metering valve can be kept relatively simple. The operation of the metering valve can therefore also be less complicated and easier to control and regulate.

Preferably, the valve chamber casing has a valve chamber housing, i.e. it comprises a valve housing or it is preferably realized as a valve housing. The valve chamber can be formed by, preferably enclosed by, such a valve housing. The valve housing essentially seals the valve chamber off from the exterior of the metering valve, so that the functioning of the valve chamber cannot be negatively affected by impurities, the uncontrolled entry of gas etc. This allows a very favorable running smoothness and a low susceptibility to failure.

Alternatively, the valve chamber casing can comprise a simple framework in which the valve chamber is arranged. This means that the valve chamber is not hermetically sealed form the outside, which can be advantageous as regards accessing the movable elements of the metering valve and visually monitoring the operation of the metering valve.

As already indicated above, in a particularly preferred embodiment of the invention the actuator assembly comprises at least one piezoelectric actuator. This means that at least one actuator or actuator assembly is based on the piezoelectric principle. Preferably, several actuators, and most preferably all actuators of the actuator assembly comprise piezo-electric actuators. This allows the movement of the outlet aperture to be controlled on the basis of a single functional principle, namely the piezoelectric principle, without requiring further actuators based on other mechanical or electrical principles of excitation. This makes the control and coordination of the actuator assembly particularly simple and effective.

Generally speaking, when compared to other mechanical or electromechanical or pneumatic/hydraulic systems, piezoelectric actuators have the advantage of very precise and rapid controllability, in particular they have a very short reaction time. Furthermore, they occupy relatively little space. In the context of the invention, a piezoelectric actuator may be understood to be a component that may be composed of several elements—for example a plurality of layered or parallel adjacent piezoelectric crystals or crystal layers or similar piezoelectric elements—but which forms a composite that is controlled as one by a control unit, for example by comprising a shared electrical connection for controlling the individual elements of which it is composed. The piezo-elements of an actuator can each behave as in a series connection, i.e. the expansions of the piezo-elements are accumulated, or as a parallel connection, i.e. the piezo-elements are connected alongside each other such as to increase the effective pressure area. In the case of multiple parallel actuator elements, each of these can be realized as a stack of series-connected piezoelectric elements (referred to as piezo-stacks).

In a further preferred development of this embodiment, the actuator assembly comprises two piezoelectric actuators. As indicated, the two piezoelectric actuators working together can be used to lengthen the stroke length in the ejection or retraction direction, essentially doubling (it in the case of identically constructed actuators). In a preferred embodiment, however, the metering valve is realized such that the first piezoelectric actuator moves the outlet aperture in the retraction direction during operation, while the second piezoelectric actuator moves the outlet aperture in the ejection direction, or vice versa. The piezoelectric actuators are therefore coupled to the valve chamber casing and the outlet aperture and aligned accordingly in their effective directions, making possible the respective opposite movements of the outlet aperture in these two directions. The effective direction axes, i.e. the (virtual) axes lie along the extension axes of actuators in which these exert their forces, i.e. the axes along which they act as loading elements, and lie essentially in the ejection and/or retraction directions of the outlet aperture.

In other words, the two piezoelectric actuators are oppositely connected, whereby a push-push configuration is realized, in which at any one time, one of the piezoelectric actuators pushes the outlet aperture or a corresponding part of a valve chamber element directly or indirectly (e.g. by means of a further mechanism). In other words, while a first of the two actuators extends and pushes the outlet aperture into one of the two directions, the second actuator contracts and thereby frees up the space necessary for the outlet aperture to move in the desired direction. Should the outlet aperture then be moved in the opposite direction, the functions of the actuators are reversed, i.e. the second actuator expands once again and pushes the outlet aperture, while the first actuator contracts to make room. A particularly stable piezoelectric actuator system is provided in this way, since piezoelectric elements are generally resilient under compression, but tensile loading can quickly lead to damage or complete destruction of the piezoelectric elements. The dimensions, arrangement and control of the actuators may particularly preferably be chosen such that the contracting actuator continues to exert a (small) counter-pressure and thus ensures a certain preloading of the expanding piezoelectric actuator, so that the latter will not overshoot excessively at the end of its movement. This avoids or minimizes internal stress that could lead to damage of the piezoelectric elements. This permits a particularly rapid movement of the outlet aperture with a high frequency and very steep transitions. Furthermore, it can be ensured that the two piezoelectric actuators in combination always have the same total overall length along their effective direction axis, and mutually cancel out their extension. In other words, its is preferred that the movement of the first piezoelectric actuator in operation cancels out the movement of the second piezoelectric actuator, and the movement of the second piezoelectric actuator in operation cancels out the movement of the first piezoelectric actuator. In this way, mechanical stresses on the overall construction (in particular the outer construction) of the metering valve can be kept as low as possible. With the exception of inertial forces, forces that act in an outward direction are essentially non-existent.

In an embodiment of the invention, at least one of the piezoelectric actuators has a cylindrical realization, preferably a tubular realization. In this way, it can be realized in a particularly uniform manner and comprises a particularly favorable cross-section: it can be inserted for example into an actuator chamber enclosed by a valve chamber, specifically by the valve chamber casing in a particularly straightforward way, since cylindrical cross-sections of actuator chambers are particularly simple to manufacture and provide, compared to rectangular chambers.

However, it is also possible to realize at least one of the piezoelectric actuators in a non-cylindrical fashion, for example with a rectangular shape. A combination of a first cylindrical piezoelectric actuator and a second non-cylindrical actuator is also possible. Rectangular-shaped actuators have the advantage of simpler manufacturability and are therefore easier to obtain. A combination of a cylindrical and a non-cylindrical actuator can on the one hand enjoy the advantage of using a cylindrical, preferably tubular actuator, namely a straightforward connection with the closure element. On the other hand, the non-cylindrical actuator can save cost and effort to a certain extent.

In many kinds of application, it is preferable that both piezoelectric actuators are constructed identically. This not only saves effort in coordinating both piezoelectric actuators, but also in the realization of an actuator chamber and accordingly also in the coordination of the control sequences.

Advantageously, an element that moves the outlet aperture, preferably the valve chamber as such can be securely clamped between the first and second (piezoelectric) actuators. This leads to an effective transfer of forces between the actuators and the valve chamber, significantly reducing friction and load-transfer losses, and thereby contributing to the increase in effectiveness of the overall metering valve.

As mentioned above, at least one of the two (piezoelectric) actuators is advantageously arranged in an actuator chamber of the valve chamber casing or the valve chamber housing. Particular advantages ensue when both piezoelectric actuators are arranged in a common actuator chamber. This makes it possible to optimize, and in particular to optimally coordinate, the cooperation of both actuators so that losses do not arise. For example, it is possible to limit the first actuator and the second actuator in their movements in the ejection and/or retraction directions, to a specified maximum total dimension within the actuator chamber. Such a maximum total dimension can be defined solely by the interior dimensions of the actuator chamber. However, spacers may also be arranged in the actuator chamber in order to reduce the interior dimension such that the specified maximum total dimension is achieved exactly. With such spacers, the total dimension can be varied in a defined manner, for instance by performing a precision adjustment of such a spacer from the outside of the actuator chamber, for example by means of screws or similar adjusting elements.

The actuator assembly can extend between a seat arrangement of a valve chamber and a counter-seat arrangement of the valve chamber casing, particularly of the valve housing. In this way, a force is exerted by the actuator assembly between the valve chamber casing (or its counter-seat arrangement) and the valve chamber (or its seat arrangement) to move the valve chamber in the ejection direction or in the retraction direction.

As mentioned above, it is generally possible that realization of the closure element can be drop-shaped, spherical, elliptical, irregular, one-sided or two-sided conical, etc. However, it is particularly preferable that the metering valve comprises a closure element that defines an effective direction of the closure element through its longitudinal extension. Preferably, it comprises an elongated plunger. Such a plunger is constructed in an essentially cylindrical fashion, but may comprise bulges or recesses on parts of its outer surface, which may also be realized as through-holes (this applies to any realization of the closure element). Such bulges or recesses can serve in particular to connect the closure element with engagement elements of other mechanical systems. By means of these engagement points, a force-fit or form-fit can be achieved in such systems for the purpose of a controlled movement and/or fixation of the closure element.

In particular, the closure element can be at least partially arranged in a cavity defined by the shape of at least one of the piezoelectric actuators, whereby it is possible that the other actuator (also piezoelectric, for example) is also hollow. Such an arrangement of the closure element in a cavity region of one of the piezoelectric actuators is particularly compact.

It has been found to be particularly favorable to realize the metering valve in such a way that the valve chamber is at least partially enclosed by a group of several, preferably at least three (preferably piezo-electric) actuator elements of an actuator, arranged in parallel and operating in parallel. An actuator therefore comprises several actuator elements that collectively deliver the forces necessary to move the valve chamber and therefore also the outlet aperture in a specific direction. In other words, the actuator is not realized in one piece, but instead comprises several partial actuators or actuator elements, spatially separate from each other and arranged in various positions about the valve chamber. The forces arising from the actuator elements essentially accumulate to give a combined force, i.e. the total actuator force.

Preferably, the valve chamber is equipped at least partially with two groups of actuator elements (preferably piezoelectric), whereby actuator elements of a first group are connected together as a first actuator, and actuator elements of a second group are connected together as a second actuator. In this way, during operation, each of the two actuators exerts a force particularly preferably in a specific direction, whereby the first actuator advantageously exerts a force in the ejection direction, and the second actuator exerts a force in the opposite direction, i.e. the retraction direction, or vice versa, resulting in a system of actuator and counter-actuator. Ultimately, this results in the push-push arrangement, as described above, of the two groups of actuator elements, i.e. the two actuators.

The actuator elements of an actuator comprising one or more actuator elements preferably run parallel to a movement direction axis of the outlet aperture or the valve chamber and are distributed uniformly about the valve chamber, e.g. with symmetry of rotation, relative to a plane that is perpendicular to the movement direction axis. The movement direction axis of such an actuator is preferably the longitudinal axis of the metering valve. A uniform distribution of the actuator elements can be achieved by a star configuration and/or other radially perpendicular arrangement relative to the central axis of the valve chamber. The uniform distribution—for example an arrangement of two diametrically opposed actuator elements or an arrangement of actuator elements subtending angles of 120° to one another about the central axis of the valve chamber—leads, among others, to an even distribution of the forces exerted by the actuator elements, and therefore also to a favorably high stability and running smoothness of the metering valve.

The valve chamber can comprise one or more parts. Preferably, the valve chamber comprises at least two parts, with a valve chamber head and a valve chamber core body, arranged in the region of the outlet aperture relative to a movement direction axis of the valve chamber. For example, the seats for the actuator assembly can be arranged on the valve chamber core body, while the valve chamber head can cooperate with a metering valve nozzle in which the outlet aperture is arranged. In particular, such an embodiment can be realized in that only the valve chamber head, or only parts thereof, come into contact with the substance, i.e. the substance flows only in this region, while the valve chamber core body can be separated from the metering material with the aid of seals. In this way, the actuator assembly can be spatially, functionally and physically separated from the fluidic, i.e. the region through which the substance flows, so that the substance cannot interfere with the operation of the actuator assembly.

In a further preferred embodiment of the invention, at least one supporting seat is arranged—for example on a bracket or on a bearing nose—on the valve chamber (specifically on the outside of the valve chamber), and an actuator extends between a seat of the valve chamber and a counter-seat of the valve chamber casing (specifically a valve chamber housing). The actuator is supported at its ends by the seat and the counter-seat.

Furthermore, a counter-bearing surface of the valve chamber casing can be arranged on a counter-bearing mass, which is preferably spring-mounted—for instance to a stationary part of the valve chamber casing, for example a valve housing. Such a spring-mounted arrangement can be realized by means of a plate spring arranged in a valve housing. The spring mount exerts a pre-tension on the respective actuator or actuator element, whereby specifically piezoelectric actuators or piezoelectric actuator elements are stressed significantly less. In particular, piezoelectric actuator elements can extend immediately when turned on, for instance to assume an initial position. The ensuing forces are effectively transferred to the spring-loaded counter-mass. In a particularly preferred embodiment of the invention, the mass of the counter-bearing mass is significantly greater than the mass of the valve chamber, i.e. at least twice, more preferably four times as great.

According to a further preferred embodiment of the inventive metering valve, the valve chamber also comprises an opening, preferably two openings, for example bores, for the substance. The opening(s) serve to guide the substance into the interior of the valve chamber, from which it is guided in the direction of the outlet aperture. The region of the opening(s) in the valve chamber therefore define the fluidic region of the valve chamber which, as described above, can be separated from the actuator region of the metering valve or valve chamber by means of seals such as ring seals. A realization of the valve chamber with two openings can for example be used to separately convey two components of a substance into the valve chamber so that these are mixed there or, and this is particularly preferred, to achieve a circulation of the substance within the valve chamber. Such a circulation is particularly advantageous in the case of viscous thixotropic or shear-thinning substances mentioned above, since the substance can be kept moving within the valve chamber. The two openings preferably do not lead centrally into the valve chamber, i.e. an opening is not directed at the center, but instead opens into the inside of the valve chamber from the side, so that its main path of travel evades the center. Such a "skewed" alignment of the openings has the advantage that the substance is effectively automatically mixed and can therefore be kept in motion.

A metering valve according to the invention preferably also comprises a metering material reservoir connected to the valve chamber by a feed line. By means of the feed line and the openings of the valve chamber, the metering material reservoir is fluidically connected to the valve chamber interior. The metering material reservoir can also be realized as a functional element that is (temporarily, as the case may be) separate from the metering valve, and which is connected to the metering valve during operation by the feed line or by a temporary connection (e.g. a mechanical holding means).

The nozzle of the metering valve is preferably interchangeable to allow metering of various substances, for instance having with different viscosities or material properties, and also to ensure easier servicing. To this end, the nozzle can be sandwiched by a nozzle cap to the outside of the metering valve and connected to the latter. Removal of the nozzle cap can then expose the nozzle and allow it to be exchanged easily.

Further advantages arise when the nozzle of the metering valve is equipped with a heating arrangement with the aid of which it can be ensured that the nozzle has a temperature conducive to setting the viscosity of the substance. In a particularly preferred embodiment of the invention, such a heating arrangement can be attached to and detached from the nozzle. This can be achieved by a non-permanent connection, for instance a clamp, between heating arrangement and nozzle. In this way, nozzle servicing steps such as replacement of the nozzle or nozzle parts can be simplified.

While it can often be advantageous to heat a nozzle of the metering valve using a heating arrangement, high temperatures can develop during operation of the actuator assembly in the interior of the metering valve, i.e. in the valve housing or in the valve chamber. Therefore, in a preferred embodiment, the valve housing and/or valve chamber comprises at least one cooling channel in order to transport a cooling medium to cool the actuator assembly. Any fluid or gaseous cooling medium can be used to this end, and the cooling channel can be realized with appropriate mechanical and chemical properties to fulfil the technical requirements of the cooling medium. Air is preferably used, in particular compressed air, whereby the latter achieves a more rapid removal of heat on account of its higher flow velocities. Air has the advantage that it has hardly any negative effect on the operation of the actuators of the actuator assembly, for example by deposits or chemical interference. The cooling channel is preferably arranged and realized so that the cooling medium can flow around the actuators of the actuator assembly. The cooling medium is fed into the cooling channel through a suitable port of the metering valve. In this case also it is preferable to enable a circulation of the cooling medium, so that two ports can be used for the cooling medium, i.e. an inlet port and an outlet port.

A further critical aspect is the connection between the actuators of the actuator assembly and the seats or counter-seats inside the metering valve. An end-face bond between actuator (or actuator element) and seat over a large surface area is preferable instead of an end-face bond over a small surface area in order to reduce stresses over the connection region. A particularly effective solution for this problem is given by bonding the actuators at their outer end faces to seats and/or counter-seats using a levelling compound, preferably adhesive. The levelling compound or adhesive increases the contact area between the actuator (or actuator element) and the seat/counter-seat area. Should it be necessary to dismantle the arrangement, for instance to carry out repairs or to perform maintenance, pressure can be applied by pressing a bolt or screw through a bore (preferably a threaded bore) of the seat/counter-seat against the actuator to release the adhesive. Instead of a levelling compound or adhesive, the actuators could be bonded to seats/counter-seats by means of rounded supports in order to avoid bending forces.

The inventive metering method is preferably realized in that the actuator assembly, which comprises a first and/or a second actuator, each of which comprises at least one piezoelectric actuator element, is controlled in a standby mode so that the first actuator and the second actuator are charged with 50% of their maximum applicable voltage. To this end, a suitable regulation or control unit can be used, which controls the respective piezoelectric actuator elements so that these are charged with the voltage value. On switching on the actuator assembly or in standby-mode, this generally results in the piezoelectric actuator being placed in a kind of pre-tension or standby position, from which these can then complete their subsequent movement. Such a substance is particularly suitable when the first and second actuators are oppositely connected, i.e. when they have exactly opposite effective directions. In this way, the two actuators hold each other in balance, and the outlet aperture is brought to a kind of middle position between its two possible extremes. An extreme position or stop is reached when one actuator is charged with 100% of its maximum applicable voltage and the other with 0% of its maximum applicable voltage.

The metering valve can generally be realized as a metering system which, in addition to the metering valve, comprises a regulation or control unit, in particular an electronic regulation or control unit which is realized to regulate or control the operation of the metering valve.

In the following, features of the invention will be discussed in detail in the context of a particularly preferred embodiment of an open metering system.

Such a metering system is particularly suited for the metering of a shear-thinning or thixotropic, fluid to viscous substance. It comprises a nozzle with a closure channel. The aperture gap and if applicable the closure element is controlled during operation by an automatic control unit if the ejection or retraction direction, whereby the outlet aperture or the closure channel is realized in at least one cross-section perpendicular to the ejection and/or retraction direction relative to the cross-section of the closure element in the same plane to give an aperture gap between the outer surface of the closure element and the inner surface of the closure channel. This outlet gap is formed and/or dimensioned to provide, at least in regions, an outlet channel for the metering material. The control unit is realized to generate control signals for different movements of the outlet aperture, and for the closure element if applicable, in at least two movement modes whereby, in at least one of the movement modes, it moves the outlet aperture (and the closure element if applicable) deliberately in order to reduce the viscosity of the substance at least in the region of the outlet gap. The inventive metering method can also be realized according to these features. The lowering of viscosity is preferably effected in one of the movement modes such that substance will not be released without additional steps being taken, i.e. the motion pattern is chosen so that the substance is held in such a low viscosity state in which the viscosity is just high enough to retain the substance in the nozzle, but in which it can be easily expelled in a further movement mode (e.g. by a more forceful movement of the outlet aperture, and closure element, as the case may be).

The size of the cross-section of the closure element relative to the cross-section of the outlet aperture is chosen on the basis of the viscosity of the substance to be applied (or its viscosity during an agitated state) on the one hand, and on a pressure applied to the substance on the other hand. The following rules of thumb apply:

The higher the pressure of the substance, the smaller the aperture gap can be.

The lower the viscosity of the substance in a resting state, the smaller the aperture gap can be.

The lower the viscosity of the substance in an agitated state, the smaller the aperture gap can be.

The size of the aperture gap in cross-section, i.e. the cross-sectional area of the aperture gap, is chosen such that, during a resting state of the outlet aperture, the substance does not move or moves significantly less compared to free flow under the same pressure conditions. In other words, the aperture gap between closure element and outlet aperture is dimensioned according to the substance and/or the pressure applied to the substance, such that, in spite of the aperture gap, a closing-off effect ensues within the nozzle on account of the shear viscosity of the substance. On the other hand, the aperture gap should also be dimensioned so that a sufficient movement of the outlet aperture (and the closure element if applicable) within the closure channel lowers the viscosity of the substance so that the substance can flow through the aperture gap, and to ensure a volumetric feed. In this way, the aperture gap will become an outlet for the substance as soon as the outlet aperture (and the closure element if applicable) moves. The closing effect given by the cooperation of the closure element and outlet aperture is therefore temporary, and is reversed by a movement of the outlet aperture to agitate the substance and make it flow.

With such a method or such a nozzle, it is possible to prepare specific substances, also highly viscous, thixotropic and shear-thinning substances, during operation of the nozzle such that they automatically alter or reduce their viscosity characteristics when the outlet aperture is moved (in combination with the closure element, as the case may be). In contrast to the known nozzle closures—for which a closure element is pressed onto the outlet aperture in order to close it, and for which the closure element is removed from the outlet aperture of the nozzle in order to uncover it—the outlet aperture can remain uncovered at all times. Even so, disadvantages as experienced by the prior art described above do not arise: the pressure applied to the substance does not need to be drastically increased, instead it is sufficient to provide the usual pressure conditions that would be applied to low-viscosity substances. At the same time, the reduction in viscosity of the substance during operation of the nozzle allows the substance to be metered, and to be metered more accurately in the ejection direction. A more accurate metering is possible, and a very precisely predefined droplet release of each droplet of the substance can be achieved. This also increases the metering speed, i.e. the potential throughput of the inventive metering system.

As mentioned above, there are preferably at least two different movement modes of the outlet aperture (in combination with movement modes of the closure element as the case may be), which can serve to perform different functions during the metering process of the substance.

A first such function can be, for example, maintaining the substance in a liquid state. To this end, a first movement mode preferably comprises a movement pattern with extremely fine up-and-down movements of the outlet aperture (and the closure element, as the case may be), whose stroke (i.e. amplitude) and/or frequency and/or sequence are chosen to be suitable for overcoming forces within the substance in order to significantly reduce its viscosity, i.e. by at least 50%, preferably by at least 99%. An "extremely fine" up-and-down movement is to be understood as a movement whose stroke is less than, and whose frequency is greater than a movement in a second movement mode (described in more detail below). Preferably, the frequency of the extremely fine movement is greater than 10 kHz. With the appropriate choice of frequency or sequence (higher in comparison to the second movement mode), a simple oscillation movement with very small stroke is sufficient to achieve such a reduction in viscosity. This first movement mode also serves to ensure the flow of the substance. Preferably however, under the usual pressure of the substance in the metering system, the movement mode with the extremely fine oscillation movements will not—on its own—result in material flowing out of the nozzle.

A second such function preferably serves to eject material through the outlet aperture of the nozzle. To this end, a second movement mode comprises a movement pattern with ejection movements of the outlet aperture (and the closure element as the case may be), whose stroke and/or frequency and/or sequence are chosen to cause the closure element to expel the substance through the outlet aperture of the nozzle in the form of droplets or a jet, whenever the outlet aperture is moved in the ejection direction, i.e. against the closure element. When the outlet aperture is moved in a retraction direction, material in the nozzle can flow in front of the closure element, to be ejected from the nozzle with the next movement of the outlet aperture in the ejection direction. In this second type of movement pattern, the stroke length is preferably longer that in the extremely fine motion pattern of the first movement mode described above, while the frequency can be lower, and a sequence can have longer intervals than a sequence used in the first function.

It shall be noted that a movement mode can also be defined in that the outlet aperture (and the closure element as the case may be) does not actually move. This movement mode can be referred to as a still-stand or closure mode, since the substance is first slowed down by the complete inactivity of the outlet aperture, and then remains in a resting state. In this resting state, its viscosity increases significantly, so that flow is no longer possible through the aperture gap.

A further movement mode can preferably comprise a motion pattern with up-and-down movements between two bounding positions, whereby the outlet opening (and the closure element if applicable) is retained in at least one of the bounding positions for a certain duration. This is particularly favorable in a movement mode that is used to eject material from the outlet aperture of the nozzle. It can deliberately ensure that, in a particular position of the outlet aperture, the material can first flow in front of the closure element prior to an ejection of the substance or that, after a drop has been ejected, the substance initially settles somewhat so that its flow is more rapidly slowed down.

In a particularly preferred embodiment, the control unit is realized or programmed to combine the various movements i.e. the various motion patterns and/or movement modes. For example, a movement mode can preferably comprise a superposition of various motion patterns. In particular, the movements of the first and second functions described above can be superposed, so that, for example, oscillations according to the first motion pattern are combined with large-stroke ejection movements according to the second motion pattern, so that the ejection movements exhibit a kind of jitter. Preferably, the various movement modes are carried out consecutively, preferably alternately. The alternating execution has the advantage that ejection of the substance can be achieved very deliberately and at precisely determined times.

The motion patterns that are to be carried out in the individual movement modes, for example which exact parameters (stroke, frequency etc.) are comprised in the motion patterns and whether there is a superposition of motion patterns and in which order the movement modes are carried out, depend on the parameters of the substance as well as the actual metering assignment (for example whether the substance is to be metered drop-wise and if yes, the drop size and the time intervals). The control unit can therefore preferably comprise a memory for storing the motion patterns and movement mode sequences for various substances and metering tasks.

To allow flow of the substance through the aperture gap, it is necessary that the aperture gap comprises at least one clearance between the outer surface of the closure element and the inner surface of the closure channel corresponding to a height of one particle of the substance, preferably to a distance given by at least three particles side by side, particularly preferably to a distance of at least 0.05 mm. Care should be taken that at least the largest particle of the substance should be able to pass through the aperture gap. The term "particle" is to be interpreted broadly in this context: it covers polymer chains or portions thereof that can be isolated under the application of shear forces on polymer chains. The "largest particle" can be defined in this context as the particles that are present under the application of shear forces that significantly reduce the viscosity: particularly in the case of substances that contain polymer chains, the reduction in viscosity can result from breaking the polymer chains in places, resulting in smaller particle sizes, of which the largest must be able to pass through the aperture gap. The minimum height refers furthermore to one of the largest particles of the substance in the sense that, in the direction of its main axis but minimally extended, it exhibits the largest size of all particles of the substance. This minimum height is to be understood as the particle size that ensues when the particle is compressed within its own specific boundaries of elasticity.

Flow of the substance can be ensured in particular when a plurality of particles—i.e. two, preferably at least three—can fit side by side in the aperture gap. Tests have shown that an annular aperture gap is particularly suitable in achieving a controlled through-flow or a controlled closure effect. This can be achieved by a circular cross-section of the inner surface of the closure channel in combination with a circular cross-section of the closure element and a preferably axial arrangement of the closure element in the closure channel. The tests have also shown that in the case of such a circular aperture gap, under the currently typical pressure conditions, a cross-sectional gap width between 0.1 mm±10% variance is particularly suitable in order to obtain a good through-flow in a movement state of the outlet aperture (in combination with that of the closure element as the case may be), and a favorable closing-off of the outlet aperture in a resting state. For substances of the type described above, typical pressures of 0.5 to 8.0 bar are currently applied. Other geometries are of course also possible. The upper limit of the extent of the aperture gap between the outer surface of the closure element and the inner surface of the closure channel, i.e. the clearance of the aperture gap, is determined as follows: the flow resistance acting on the substance on account of the clearance must be at least as large as a flow resistance acting on the substance in the region of an outlet aperture of the nozzle. If the flow resistance in the region of the closure channel were to be smaller that in the region of the outlet aperture, material would not be expelled from the outlet nozzle. The results of tests and simulations are summarized in the following table of clearance (i.e. the gap width) as dependent on the dimensions of the outlet aperture and the closure element, assuming that the outlet aperture is always 0.5 mm long, and the length of the aperture gap through which the substance is passed is always 10 mm:

| Outlet aperture diameter in mm | Closure element diameter, realized as a cylindrical plunger in the region of the aperture gap, in mm | Maximum clearance in mm |
| --- | --- | --- |
| 0.05 | 1 | 0.006 |
| 0.1 | | 0.02 |
| 0.2 | | 0.09 |
| 0.4 | | 0.35 |
| 1 | | 2.3 |
| 0.05 | 1.5 | 0.004 |
| 0.1 | | 0.015 |
| 0.2 | | 0.05 |
| 0.4 | | 0.24 |
| 1 | | 1.5 |
| 0.05 | 2 | 0.003 |
| 0.1 | | 0.012 |
| 0.2 | | 0.045 |
| 0.4 | | 0.18 |
| 1 | | 1.12 |
| 0.05 | 4 | 0.001 |
| 0.1 | | 0.005 |
| 0.2 | | 0.023 |
| 0.4 | | 0.09 |
| 1 | | 0.56 |

These parameter combinations are to be understood as preferred embodiments in each case.

Preferably, when dimensioning the aperture gap, in addition to the flow resistance it should also be considered that the substance should be brought slowly from a fluid state to a resting state in the aperture gap, to subsequently seal the aperture gap. The aperture gap should therefore permit a certain braking effect. This braking effect is preferably always initiated when the outlet aperture (and the closure element if applicable) is brought into a stationary state from a movement relative to the closure channel.

Instead of having an annular or otherwise circumferential shape, the aperture gap can be formed in cross-section in a specific area only, for example as a recess in the closure element. In each case, the shape can be chosen individually depending on the field of application, particularly in consideration of the above-mentioned parameters influencing pressure on the substance and its viscosity. The metering system according to the invention therefore preferably comprises a plurality of (exchangeable) closure elements and/or (exchangeable) closure channels of which at least one closure element and one closure channel have complementary shapes so that, together, they form an aperture gap of the type explained in detail above. These exchangeable arrangements can be inserted into the nozzle depending on the material to be metered in each case. Preferably, the (exchangeable) closure elements or (exchangeable) closure channels each comprise markings to indicate their related parts and/or applicability for certain substances. The valve chamber head can, for instance, comprise or form the closure channel.

In a particularly preferred embodiment of the invention, the nozzle also comprises a metering material collection cavity in the region of the nozzle, particularly preferably in a nozzle end region bordering the outlet aperture. This metering material collection cavity is arranged between the closure channel and the outlet aperture, and is formed or positioned such that it is at least not completely filled by the closure element on account of its size and position. A metering material collection cavity is preferred whose dimensions are greater in cross-section that the total area of the aperture gap between the closure element and the closure channel. Since the material that has passed through the aperture gap can be collected in this metering material collection cavity and then precisely expelled through the outlet aperture by a longer stroke of the outlet aperture (combined with a stroke of the closure element as the case may be) during a movement in the ejection direction, a well-metered, rapid and precise ejection of the material is possible, particularly in drop form.

To prepare the substance in the nozzle, it is supplied via a supply line from a metering material reservoir. In principle, it is possible to use the aperture gap simply as a kind of holding area or preparatory region for the substance, in which portions of the supplied material are deposited and made liquid by appropriate movements of the outlet aperture (and closure element, if appropriate). However, the metering system preferably comprises a supply line from a metering material reservoir to supply material, whereby the supply line leads to the aperture gap formed by the closure channel and/or which is arranged at an end of the closure channel furthest away from an outlet aperture of the nozzle. The supply line from the metering material reservoir in this case leads directly or indirectly into the region of the closure channel, i.e. of the aperture gap, for example over the openings or bores in the valve chamber as mentioned above. This has the effect that the substance must in any case flow at least through some part of the aperture gap, so that the aperture gap exercises an opening or closing effect for the flow of material.

As mentioned above, the metering system according to the invention preferably also comprises a metering material reservoir, which is connected to the nozzle by means of a feed line in the direction of an outlet aperture. Provisioning of the substance is therefore effected within the metering system, so that this can be constructed and transported as one unit.

As described above, the movement of the outlet aperture is carried out with the aid of an actuator assembly. To this end, and to regulate the pressure, the metering system preferably comprises an electronic control unit for the control of the actuator assembly and/or a pressure in a metering material reservoir of the metering system. The control unit does not necessarily have to be arranged within the metering valve, but can be arranged externally. It can be connected to the interior of the metering valve by means of control wires. The actuator system does not behave on the basis of an inherent logic, but is controlled in an "intelligent" manner by an electronic control unit, which can for instance comprise a processor that provides software-generated control signals to the actuator system. Such control units can achieve metering frequencies in the region of 14 kHz, which means that the movement of the outlet aperture (and also the closure element as the case may be) can be controlled very precisely. The control unit can be realized to generate control signals for various movements of the outlet aperture (and also the closure element if applicable) in at least two movement modes.

Other objects and features of the present invention will become apparent from the following detailed descriptions considered in conjunction with the accompanying drawings. In the diagrams, like numbers refer to like objects throughout.

FIGS. 1 to 6 show a metering valve according to an embodiment of the invention, in various complete and partial views, whereby FIGS. 1 and 6 show views along sectional lines G-G and F-F of FIG. 2, and reference is made mostly to these drawings.

Figure 1:
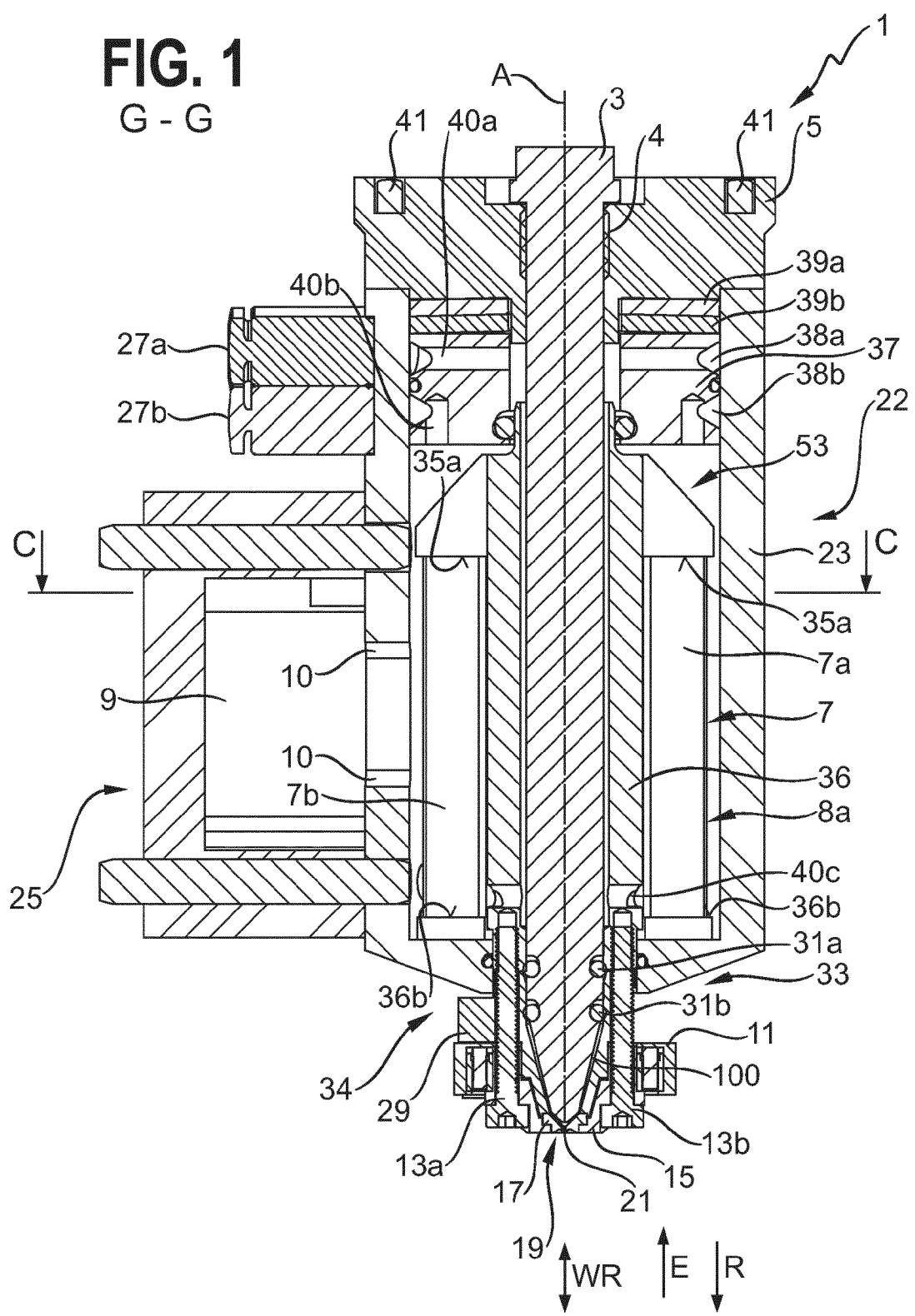
FIG. 1 shows a sectional view of an embodiment of a metering valve according to the invention along a first longitudinal section G-G of FIG. 2.

The metering valve 1 comprises a valve chamber 33 with a nozzle 19, and a valve housing 22, in which an actuator chamber 53 is arranged in addition to the valve chamber 33. The valve housing 22 comprises a first lower housing portion 23 and a second upper housing portion 5 in the form of a cover 5. Both housing portions 5, 23 are joined by means of retaining screws 41.

The actuator chamber 53 is centrally arranged in the valve chamber 22. Underneath the cover 5, a first piezoelectric actuator 8a and a second piezoelectric actuator 8b (cf. FIG. 6) are positioned along a (central) axis A and aligned in the direction of axis A, and connected by means of plate springs 39a, 39b and a moveable counter-body (i.e. a counter-mass). Together, the piezoelectric actuators 8a, 8b form an actuator assembly 7. The first piezoelectric actuator 8a comprises three first piezoelectric actuator elements 7a, 7b, 7c and the second piezoelectric actuator 8b comprises three second piezoelectric actuator elements 7d, 7e, 7f. The arrangement and behavior of these actuator elements 7a, 7b, 7c, 7d, 7e, 7f will be explained in more detail in the description of FIGS. 3 and 4.

A valve chamber 33 is arranged in the valve housing 22, coupled between the actuator elements 7a, 7b, 7c, 7d, 7e, 7f. The geometry and coupling with the actuator elements 7a, 7b, 7c, 7d, 7e, 7f, as well as the behavior of the valve chamber 33 will be explained with the aid of FIGS. 5a to 5c.

Two compressed-air ports 27a, 27b on the lower housing body 23, below cover 5, can be seen on the left-hand side of FIG. 1. An electronics housing 25 is arranged below the compressed-air connectors 27a, 27b, enclosing a control unit 9 which is connected to the two piezoelectric actuators 8a, 8b via electrical connections (not shown), that pass through connecting bores 10 through the valve housing 22, and which controls these during operation of the metering valve. Here, the electronics housing 25 is secured to the valve housing 22 of the metering valve 1, but equally it could be detachably connected.

In this embodiment, the valve chamber 33 comprises two parts, namely a valve chamber head 34 in the region of the outlet aperture 21 or in the region of the metering valve fluidics, and a valve chamber core body 36, particularly in the region of the actuator chamber 53.

A heating arrangement 11 is clamped onto the nozzle 19 to heat the nozzle 19 during operation. The nozzle 19 itself comprises a nozzle body 17, which tapers downwards in the drawing, and which terminates in the outlet aperture 21. A nozzle cap 15 is attached to this, as shown in the lower part of the diagram, connecting the nozzle 19 to the valve chamber 33 by means of connecting screws 13a, 13b. In this way, the nozzle body 17 is sandwiched securely between the nozzle cap 15 and the valve chamber 33, and ultimately forms a lower end region of the valve chamber 33. The valve chamber head 34 is clamped between the nozzle cap 15 and the valve chamber core body 36.

A stationary closure element 3 in the form of a plunger 3 is attached centrally to the valve housing 22, aligned along axis A. The plunger 3 is securely connected to the valve housing 22 by a screw thread 4 in the cover 5. It is inserted though the actuator chamber 53 and through the valve chamber 33 and can be screwed in through the cover 5 without having to open the valve housing 22. Its shape tapers inward in the region of the nozzle 16, largely following the inner shape of the nozzle body 17, while always leaving a certain aperture gap 100 between nozzle body 17 and plunger 3, so that the nozzle of the metering valve 1 is never completely sealed off towards the outside.

The nozzle 19 is fed by a metering material supply unit 29, which feeds a substance (not shown) into the aperture gap 100 via channels or openings (47a, 47b—cf. FIG. 8). The substance travels onwards through the aperture gap 100 in the direction of the outlet aperture 21. The region of the aperture gap 100, i.e. the "fluidic" part of the valve chamber 33, is functionally and fluidically separated from an upper "actuator region" of the valve chamber 33 by means of ring seals 31a, 31b, so that material cannot enter into this actuator region.

As mentioned above, in the prior art metering valves, a closure element 3 or plunger 2 is moved in order to transport material through the outlet aperture. The present invention replaces this motion of the closure element partially or—as in the present exemplary embodiment—entirely by motion of the outlet aperture 21 instead. This means that the actuator mechanism 7 moves the outlet aperture 21 back and forth along an effective direction axis WR by moving the valve chamber 33. To this end, the outlet aperture 21 is moved upwards in an ejection direction E and downwards in a retraction direction R. The ejection direction E of the outlet aperture 21 is to be understood as the direction of motion in which material is ejected by the plunger 3. When the outlet aperture 21 moves in the ejection direction E, material is pushed by the plunger 3 through the outlet aperture 21. In contrast, when moved in the retraction direction R, the plunger 3 retracts relative to the outlet aperture 21, since this is being moved outward away from the plunger 3.

Both piezoelectric actuators 8a, 8b are arranged so that they move essentially in the axial direction along axis A during operation. The piezoelectric actuators 8a, 8b are piezo-stacks of rectangular piezo-elements. The piezoelectric actuators 8a, 8b are oppositely directed. This means that the first piezoelectric actuator 8a reduces its total length in a longitudinal, i.e. vertical direction while, at the same, the second piezoelectric actuator 8b extends its total length in the same direction and by the same amount. In the same way, the first piezoelectric actuator 8a increases its total length in the longitudinal direction while, at the same, the second piezoelectric actuator 8b reduces its length in the same direction and by the same amount.

During operation of the metering valve 1, the control unit 9 generates first and second control signals that are forwarded to the two piezoelectric actuators 8a, 8b to control their movement, i.e. their deflection. The control signals are generated so that the piezoelectric actuators 8a, 8b are oppositely excited. This leads to an opposing motion pattern of the two piezoelectric actuators 8a, 8b. The motion of the first piezoelectric actuator 8a, which is connected to the outlet aperture 21, causes the outlet aperture 21 to move in an up-and-down manner. When the second piezoelectric actuator 8b contracts while the first piezoelectric actuator 8a is simultaneously extending, the outlet aperture 21 is pushed in the ejection direction E by the first piezoelectric actuator 8a. In the opposing motion, the outlet aperture 21 is pushed downwards in the retraction direction R by the second piezoelectric actuator 8b. The effective direction axis WR, shared in this case by the two piezoelectric actuators 8a, 8b is therefore exactly aligned on axis A, as are the ejection and retraction directions, whereby the indirect coupling of the outlet aperture 21 with the actuator mechanism 7 given by the first piezoelectric actuator 8a and the second piezoelectric actuator 8b ensures that the outlet aperture 21 is always pushed in the desired direction by the piezoelectric actuator 8a, 8b that is extending.

Compressed air can enter the actuator chamber 53 and can be guided back out again via the compressed-air connectors 27a, 27b. The upper compressed-air connector 27a acts as an air inlet 27a, while the lower compressed-air connector 27b serves as an air outlet 27b. To guide the compressed air, the counter-bearing body 37 comprises two annular grooves 38a, 38b as well as through-bores 40a, 40b as cooling channels. The compressed air is guided from the air inlet connector 27a through the upper groove 38a through the corresponding (upper horizontal) bore 40a and into the interior of the upper part of the valve chamber 33 along the plunger 3, and via the (horizontal) bores 40c (acting as further cooling channels) of the valve chamber 33 onwards in the direction of the actuator mechanism 7. In this way, the air flows over the actuator elements 7a, 7b, 7c, 7d, 7e, 7f between the valve chamber 33 and the valve housing 22 to reach the second groove 38b via second (upper vertical) bores 40b in the counter-block 37, from which it arrives at the air outlet connector 27b. In this way, the compressed air can circulate as a cooling medium in the region of the actuator chamber 53 of the valve housing, and can effectively cool the actuators 8a, 8b in particular.

Figure 3:
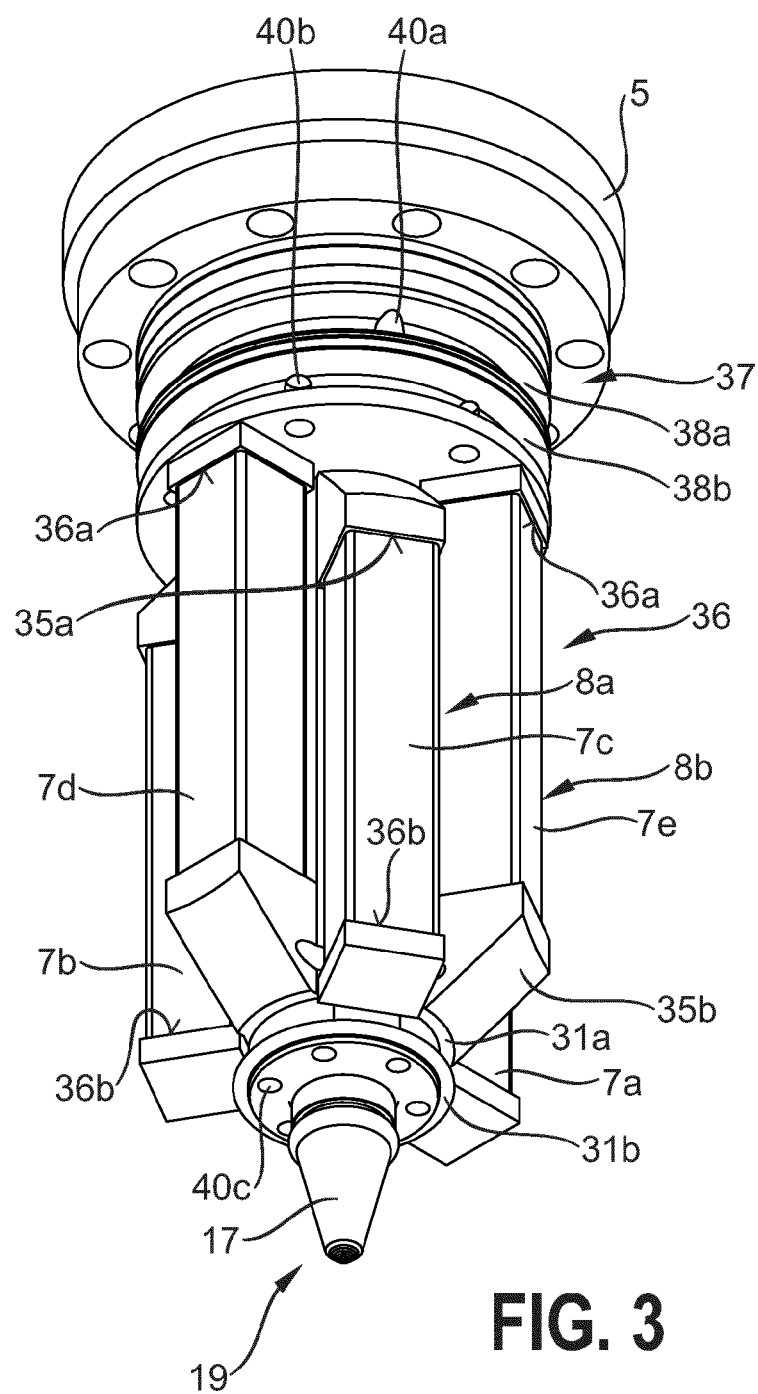
FIG. 3 shows a detailed view of selected elements in the interior of the same metering valve.
Figure 4:
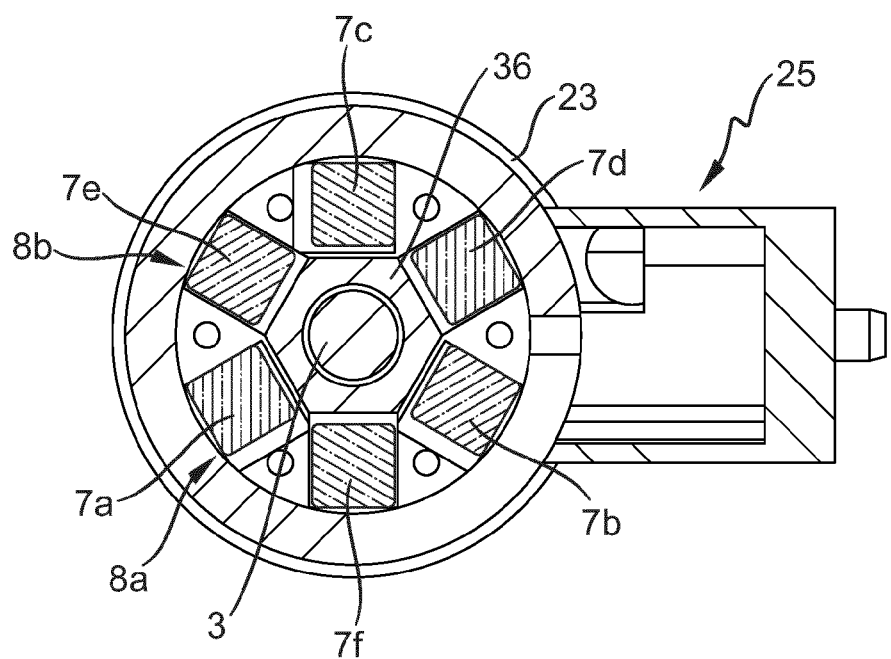
FIG. 4 shows a sectional view of the same metering valve in a cross-section along section C-C of FIG. 1.

FIG. 3 shows a perspective view of selected parts of the inventive metering valve 1, namely the valve chamber core body 36 with the actuators 8a, 8b and actuator elements 7a, 7b, 7c, 7d, 7e. In this view, actuator element 7f is hidden by the valve chamber core body 36. The diagram also shows the counter-body 37 and the cover 5.

The actuator elements 7a, 7b, 7c of the first actuator 8a are held at their lower outer faces, i.e. in the direction of the outlet aperture 21, in counter-seats 36b; and are held at their upper outer faces, i.e. at the opposite end, in seats 35a of nose-like (slanted) brackets that are secured to the valve chamber core body 36 or that protrude from the valve chamber core body 36. In the same way, the actuator elements 7d, 7e, 7f of the second actuator 8b are held at their lower outer faces, i.e. in the direction of the outlet aperture 21, in seats 35b of corresponding nose-like brackets; and are held at their upper outer faces, i.e. at the opposite end, in counter-seats 36a. The brackets with seats 36a are secured to the valve chamber core body 36 or protrude from the valve chamber core body 36. In contrast, the seats 36a are spring-loaded (via the counter-mass 37) against the valve housing 22 (cf. FIGS. 1 and 6), so that when the actuator elements 7a, 7b, 7c of the first actuator 8a expand, the valve chamber core body 36 and therefore also the outlet aperture 21 are displaced upwards in the ejection direction E. When the actuator elements 7d, 7e, 7f of the second actuator 8b expand, the valve chamber core body 36 and therefore also the outlet aperture 21 is displaced downwards in the retraction direction R.

With the aid of FIGS. 3, 4 and FIGS. 5a-5c, it can be seen that the actuator elements 7a, 7b, 7c, 7d, 7e, 7f are arranged radially about axis A, which is also the central axis A of the valve chamber element 45. Each of the two actuators 8a, 8b comprises three actuator elements 7a, 7b, 7c; 7d, 7e, 7f, whereby the actuator elements 7a, 7b, 7c; 7d, 7e, 7f of an actuator 8a, 8b are offset from each other by 120° about axis A, and whereby an actuator element 7a, 7b, 7c of the first actuator 8a always neighbors an actuator element 7d, 7e, 7f of the second actuator 8b. The result is a uniform, rotationally symmetric arrangement of the actuator elements 7a, 7b, 7c, 7d, 7e, 7f in a star formation, in which an actuator element 7a, 7b, 7c of the first actuator 8a is always opposite an actuator element 7d, 7e, 7f of the second actuator 8b with regard to axis A.

Figure 5A:
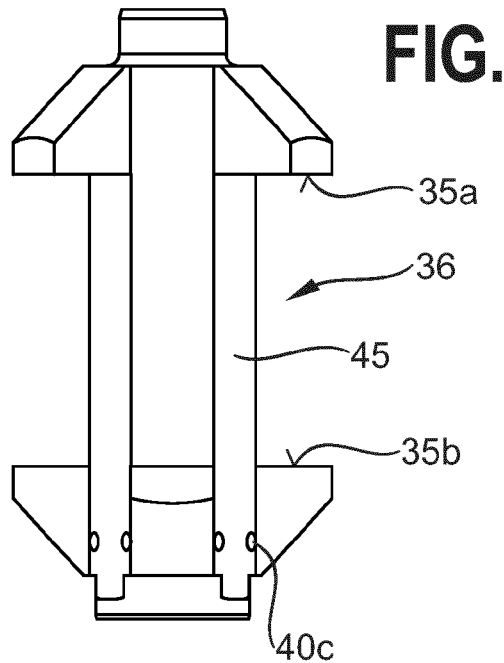
FIGS. 5a to 5c show detailed longitudinal cross-section, perspective and plan views of the valve chamber of the same metering valve.
Figure 5B:
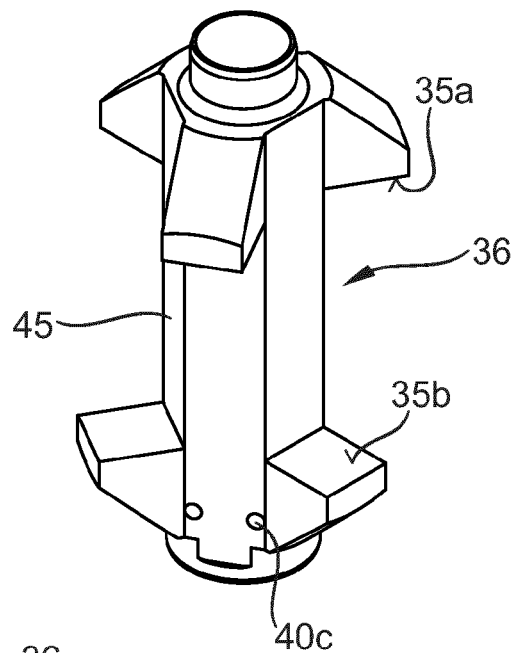
Figure 5C:
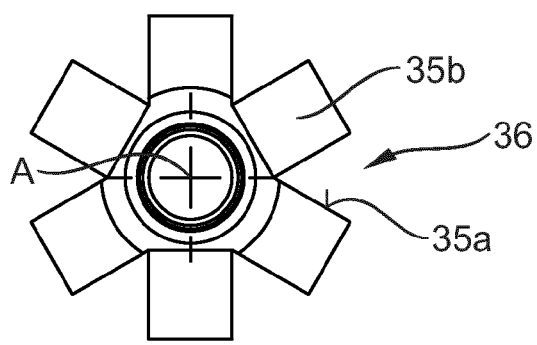

Regarding FIGS. 5a and 5b, it will be noted that the valve chamber core body 36 is made in one piece. It has a main body 45 and the support brackets. The bores 40c mentioned above are low down on the main body 45, at about the level of the lower third of the lower support brackets 35b.

Figure 2:
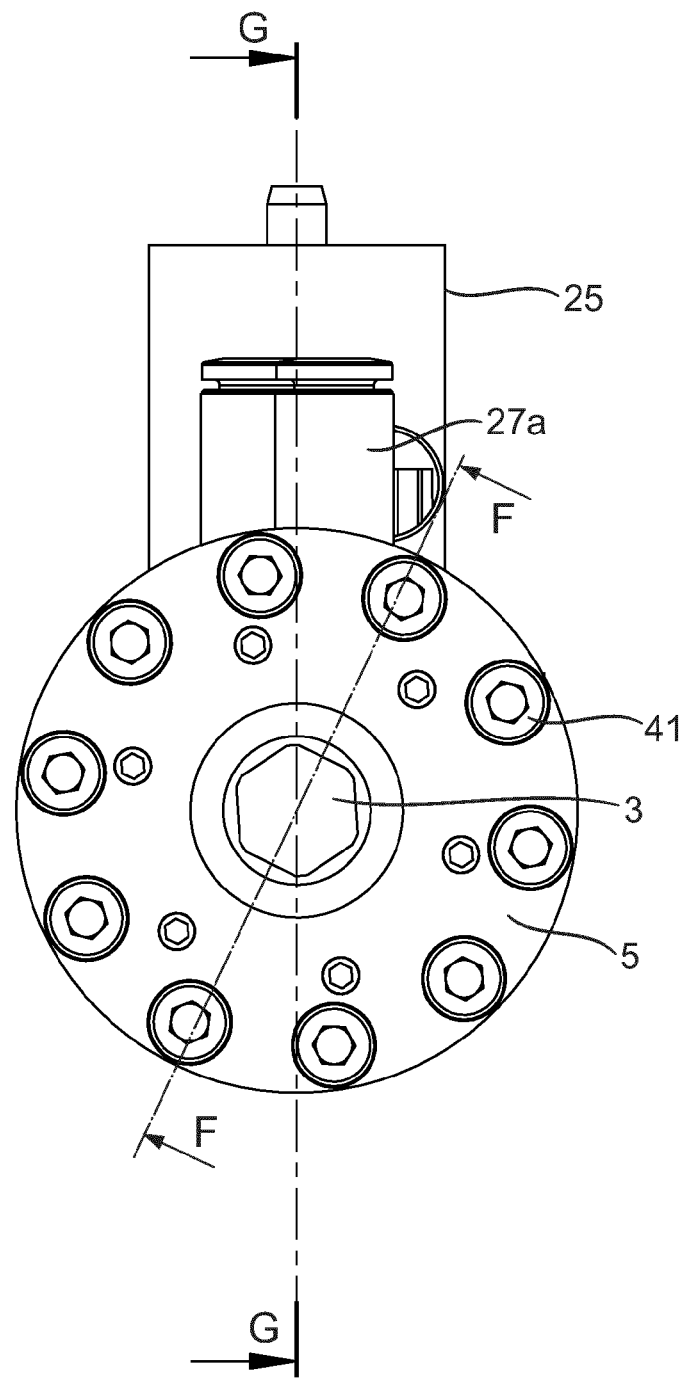
FIG. 2 shows a plan view of the same metering valve.
Figure 6:
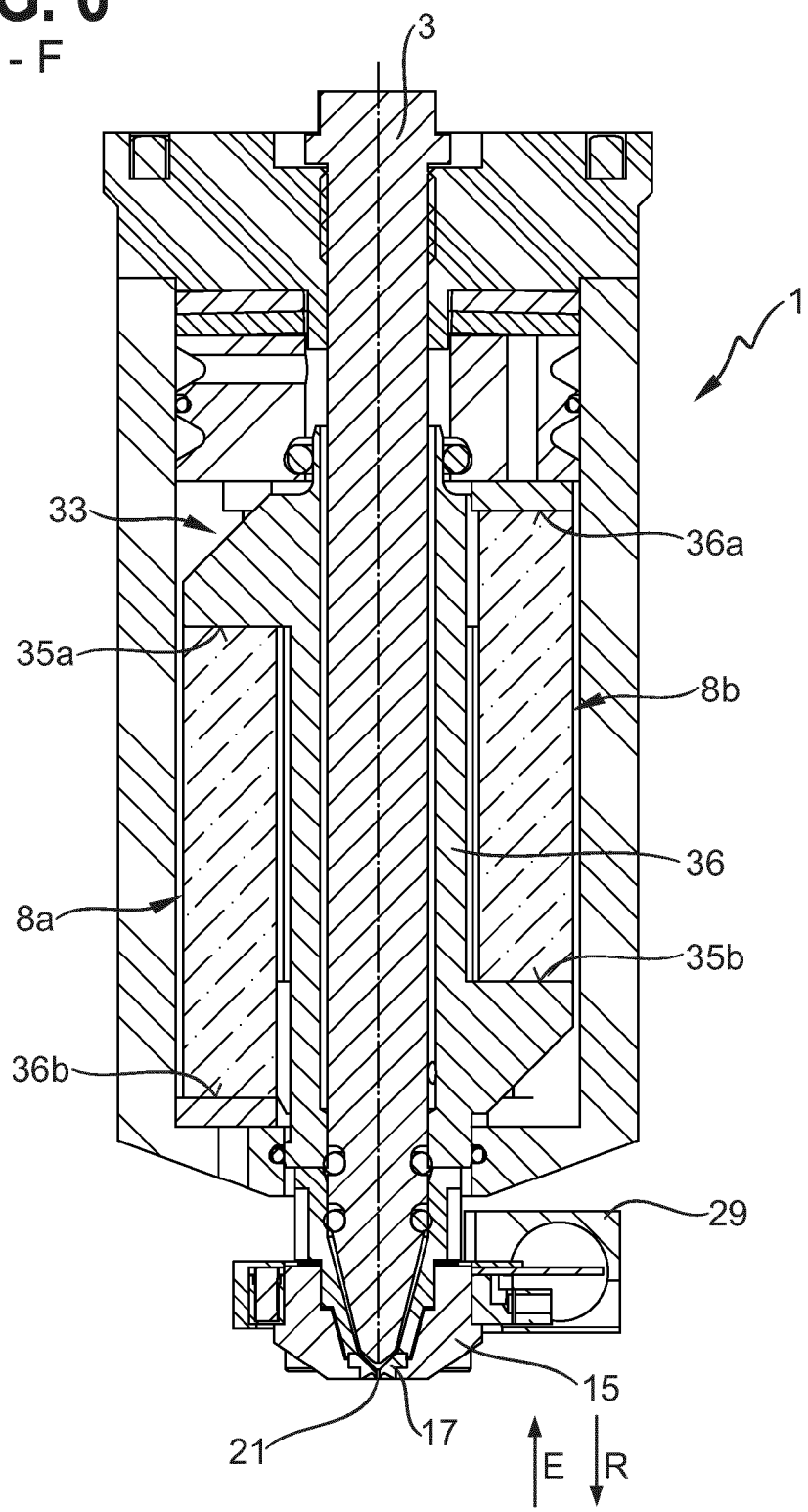
FIG. 6 shows a sectional view of the same metering valve along a second longitudinal cross-section F-F of FIG. 2.

To further clarify the principle of operation of the metering valve, FIG. 6 shows a second longitudinal section F-F (cf. FIG. 2). Instead of two actuator elements of the same actuator, the section orientation shows one actuator element each of the first actuator 8a and second actuator 8b. The diagram also shows the metering material supply unit 29 in cross-section.

Assembly of the metering valve 1 shown here can be carried out as follows: The piezoelectric actuators 7a, 7b, 7c, 7d, 7e, 7f are first glued to the valve chamber core body 36 at seats 35a, 35b. The piezoelectric actuators 7a, 7b, 7c, 7d, 7e, 7f are then electrically connected to the control unit 9. The assembled unit comprising piezoelectric actuators 7a, 7b, 7c, 7d, 7e, 7f and main body 45 is then inserted into the valve housing 22, followed by the counter-mass 37 and the plate springs 39a, 39b. The valve is then sealed by the cover 5, and finally the plunger 3—which has a hex head—is screwed into the valve housing 22 by means of thread 4.

Figure 7A:
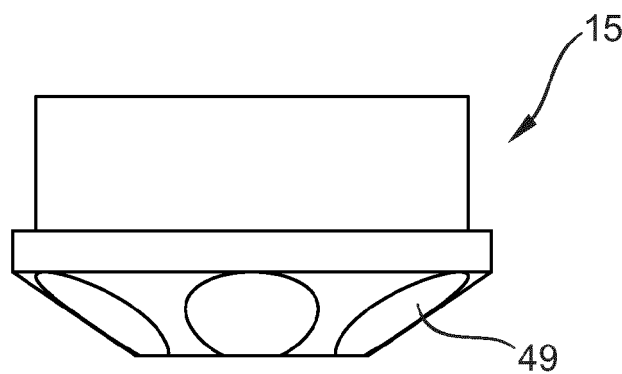
FIGS. 7a to 7c show detailed side, plan and perspective views of the nozzle cap of the same metering valve.
Figure 7B:
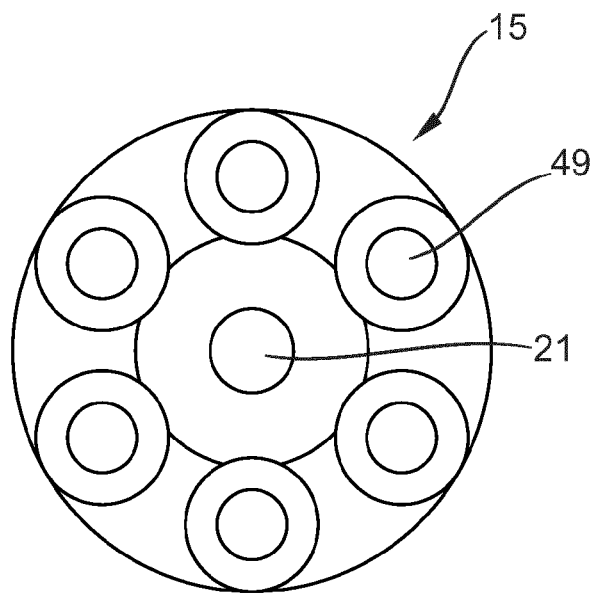
Figure 7C:
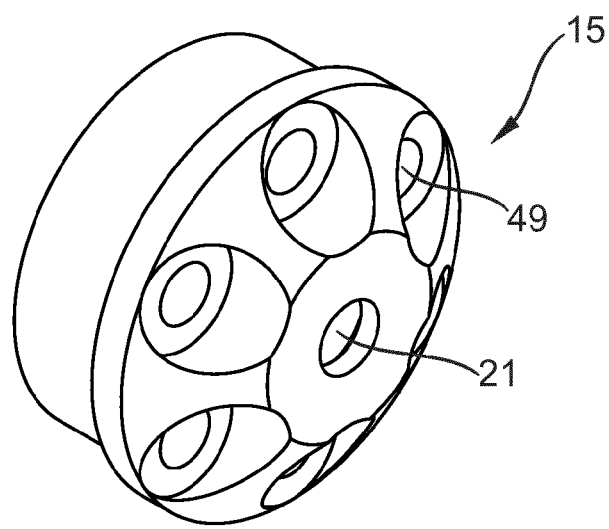

The nozzle cap 15 (of the metering valve 1 of FIG. 1) is shown in side view in FIG. 7a, from below in FIG. 7b, and in perspective view in FIG. 7c. It has openings 49 through which connecting screws can be inserted, for example the screws 13a, 13b shown in FIG. 1. The nozzle body with the outlet aperture 21 is laid into an opening centered in the middle. The nozzle cap 15 can be removed from the nozzle body 17 by removing the connecting screws 13a, 13b, to expose the nozzle body 1 which in turn can also be detached from the metering valve 1 and replaced by another nozzle body if necessary.

Figure 8A:
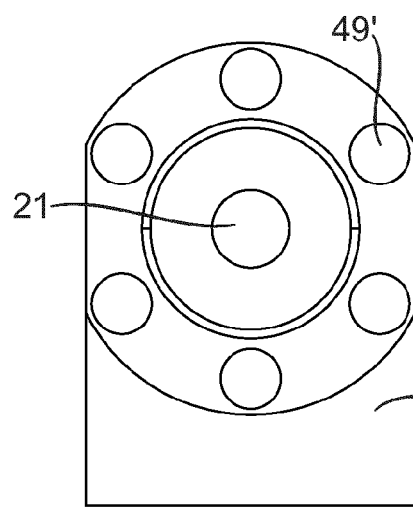
FIGS. 8a to 8d show a plan view from beneath, a side view, a cross-section along B-B of FIG. 8b and a perspective view of the same metering valve.
Figure 8B:
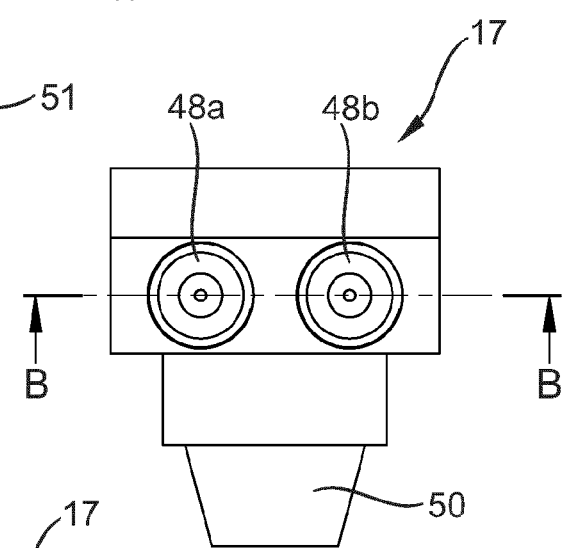
Figure 8C:
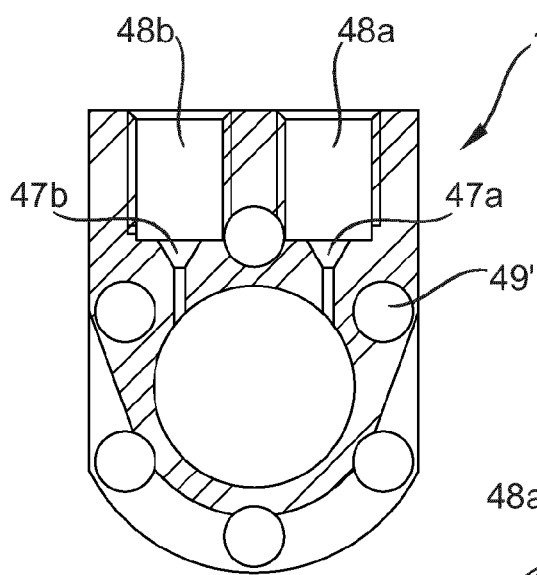
Figure 8D:
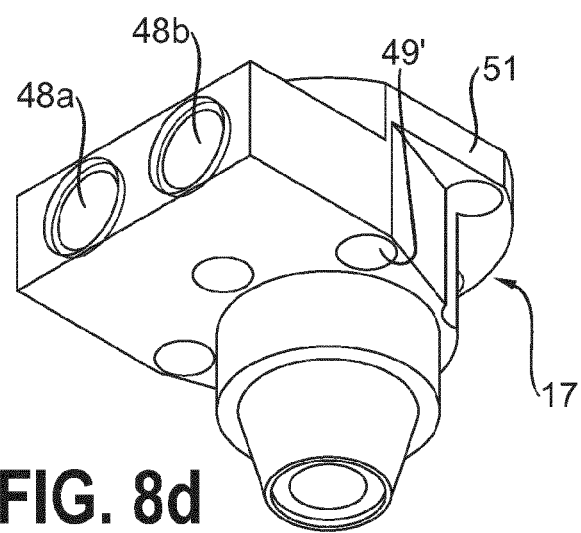

As mentioned above, the exemplary metering valve 1 is realized as an open system. In the context of the invention, it is particularly preferred to realize certain movement modes of the outlet aperture 21, as will be explained in more detail in the following:

FIGS. 8a-8d show various views of the nozzle body 17, namely a plan view from above in FIG. 8a, a side view in FIG. 8b, a sectional view along B-B in FIG. 8c, and a perspective view from below in FIG. 8d.

The diagrams clearly show continuation bores 49', whose positions correspond with the openings 49 in the nozzle cap 15, so that connecting screws such as those shown in FIG. 1 can be inserted. The diagrams also show the arrangement of openings 47a, 47b, through which the substance reaches the aperture gap 100 in the direction of the outlet aperture 21. At the outer side, the openings 47a, 47b terminate in connection openings 48a, 48b for making the connection to the metering material supply unit 29. FIG. 8c clearly shows that the openings do not lead toward the center of the nozzle body 17, but are laterally offset so that the openings and therefore also the substance are not directed at the center of the nozzle body 17, but to the side. This allows a curved in-feed of the substance into the aperture gap 100 and/or a mixing of the substance.

Figure 9:
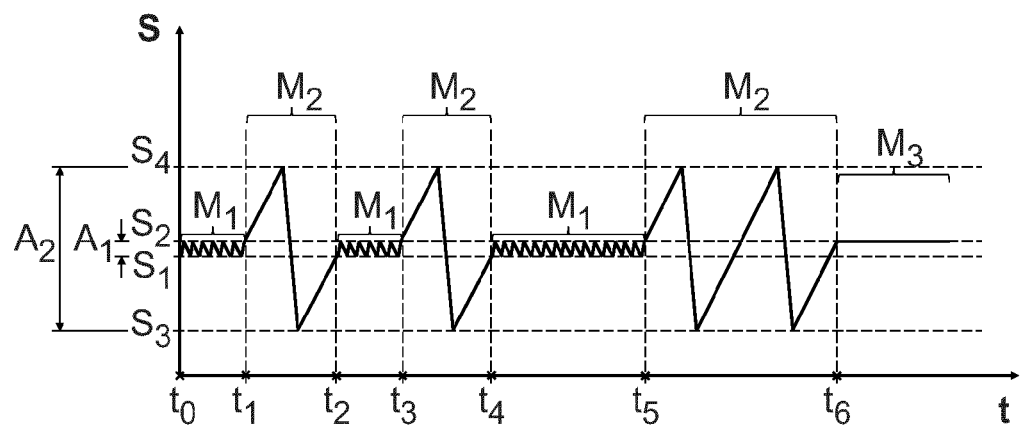
FIG. 9 shows a schematic representation of a path of motion of an outlet aperture in a first embodiment of the metering method according to the invention.

In this context, FIG. 9 schematically shows one possible motion pattern of the outlet aperture 21. The path s (not to any scale) of the outlet aperture 21 is shown against time t (also not to any scale). It can be seen that the outlet aperture 21 carries out three different movement modes $M_1$, $M_2$, $M_3$.

A first movement mode $M_1$ is performed between a zero time instant $t_0$ and a first time instant $t_1$, between a second time instant $t_2$ and a third time instant $t_3$ and between a fourth time instant $t_4$ and a fifth time instant $t_5$. This movement mode $M_1$ comprises small, relative rapid oscillations between two positions $s_1$, $s_2$. Here, the movement of the outlet aperture 21 has only small amplitude $A_1$ or a short stroke $A_1$, with a uniform rate and a relatively high frequency. This movement serves exclusively to maintain the liquidity of the substance, whereby it is not liquefied to the extent that substance would continually seep from the nozzle. The first movement mode $M_1$ may therefore be characterized as a fluidity maintenance mode.

In contrast, the second movement mode $M_2$, performed between the first time instant $t_1$ and the second time instant $t_2$, between the third time instant $t_3$ and the fourth time instant $t_4$, and between the fifth time instant $t_5$ and a sixth time instant $t_6$ comprises a different pattern of motion. It serves to eject material from the outlet aperture 21 and may therefore be described as an ejection mode. For this reason it has a greater amplitude $A_2$ or longer stroke $A_2$. Its frequency, which can be clearly seen in the double ejection movement between the fifth time instant $t_5$ and the sixth time instant $t_6$, is significantly lower than that of the motion in the first movement mode $M_1$. The rate of this movement can also be described as uniform. The third movement mode $M_3$, performed after the sixth time instant $t_6$, comprises a simple stand-still of the outlet aperture 21 and has the effect that the substance is initially slowed in the aperture gap 100 due to its inherent friction, and then held, since its viscosity is no longer reduced by any motion of the outlet aperture 21.

Figure 10:
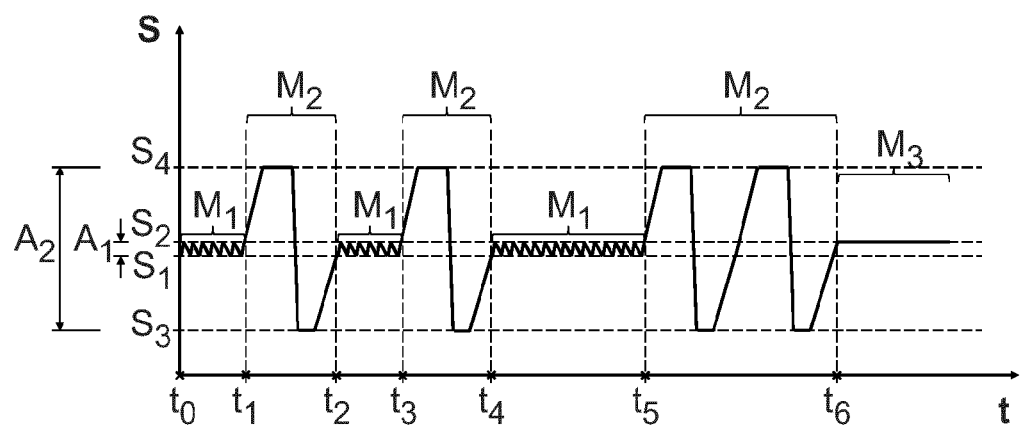
FIG. 10 shows a schematic representation of a path of motion of an outlet aperture in a second embodiment of the metering method according to the invention.

The motion pattern of FIG. 10 differs from the motion graph of FIG. 9 only in the ejection mode $M_4$. Instead of a simple saw-tooth up-and-down movement as in the second movement mode $M_2$ of FIG. 9, the outlet aperture 21 maintains a lower position $s_4$ for a certain duration. During this time, material can flow in front of the closure element 3. This is followed by a very rapid movement of the outlet aperture 21 in the ejection direction E. The outlet aperture 21 once again maintains its uppermost position $s_3$, i.e. a position closest to the plunger, for a certain duration. During this time, the movement of the substance is somewhat checked, in order to avoid a delayed release of material in a subsequent movement of the outlet aperture 21 in the retraction direction.

Figure 11:
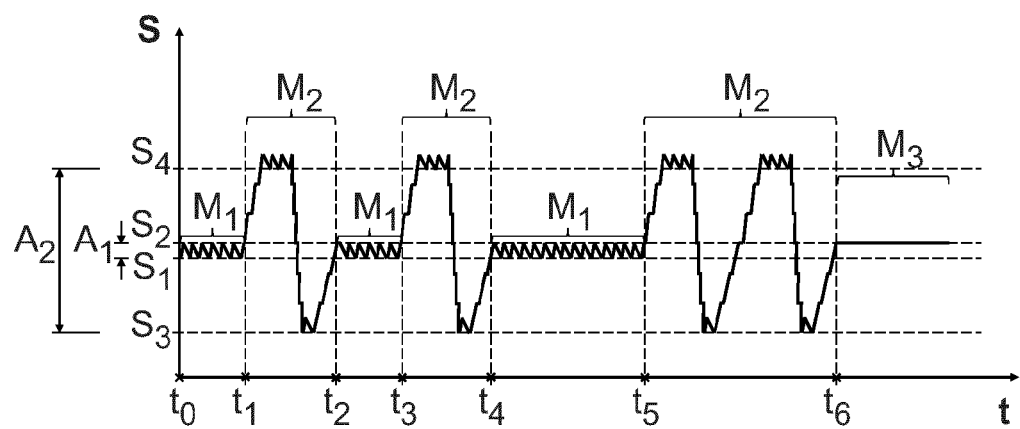
FIG. 11 shows a schematic representation of a path of motion of an outlet aperture in a third embodiment of the metering method according to the invention.

The motion pattern of FIG. 11 again differs from the motion graph of FIG. 10 only in the ejection mode $M_5$. Here, the motion pattern in the first movement mode $M_1$—i.e. the jittering motion of the outlet aperture 21—is superposed during the ejection movement on the motion pattern $M_4$ of the movement mode shown in FIG. 9. This is expedient when the viscosity of the substance increases relatively quickly when the extremely fine jitter motion ceases. Superposing the motion patterns ensures that the viscosity of the substance is continually lowered.

Figure 12:
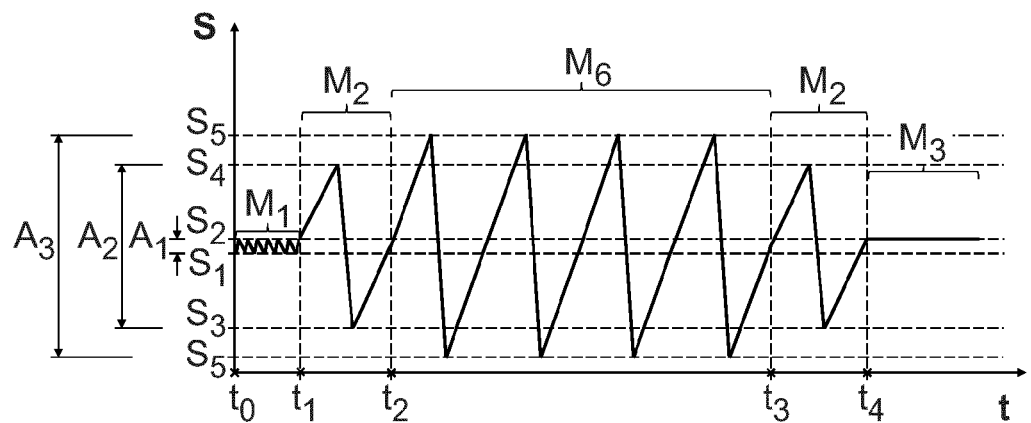
FIG. 12 shows a schematic representation of a path of motion of an outlet aperture in a fourth embodiment of the metering method according to the invention.

FIG. 12 shows a motion pattern that can for instance be suitable for printing a "bead", i.e. an uninterrupted band of uniform thickness, by closely depositing individual dots of the substance side by side. Depending on the substance, the first and last drops might be larger than the intermediate drops, even if the stroke length of the outlet aperture 21 was the same for each drop. In this case, it can be expedient to apply different ejection modes $M_2$, $M_6$, that only differ in their stroke lengths. For example, for the first and last drops, a movement mode $M_2$ can be selected that has a shorter stroke than for the intermediate drops.

The examples clearly show that it is ideally possible with the invention to precisely adjust the specific parameters of the different movement modes and the sequence of the movement modes to each of the metering materials to be processed as well as to the metering task.

It shall be noted that the components of the metering valve and the metering system and actuator assembly, described in detail above, are simply exemplary embodiments that could be adapted by the skilled person in various ways and by combining various features without departing from the scope of the invention. For example, it is not strictly necessary that only the outlet aperture be moved while the plunger always remains stationary. Instead, it is also possible to move the plunger at times. To this end, the plunger can be moveable within the metering valve, but, for control reasons, might only perform certain movements over and above those of the outlet aperture. In that case, the outlet opening need not carry out each movement in parallel to a (moveable) plunger, but could equally be moved selectively, for example according to the chosen (i.e. programmed) movement mode. Of relevance to the invention is that the outlet aperture is moved in at least one of the movement modes. Equally, a nozzle can be realized as a simple aperture, i.e. an essentially planar element with a straight through-hole as outlet aperture instead of an assembly that tapers towards the outlet opening. Furthermore, it is to be understood that the use of "a" or "an" throughout this application does not exclude a plurality. Furthermore, a "unit" may comprise one or more components that may also be spatially separate.

LIST OF REFERENCE SIGNS 1 metering valve
3 closure element/plunger
4 thread
5 second housing part/cover
7 actuator assembly
7a, 7b, 7c, 7d, 7e, 7f actuator element
8a first (piezoelectric) actuator
8b second (piezoelectric) actuator
9 control unit
10 connecting bores
11 heating arrangement
13a, 13b locking screws
15 nozzle cap
17 nozzle body
19 nozzle
21 outlet aperture
22 valve housing
23 valve chamber casing
25 electronics housing
27a, 27b connectors for compressed air
29 metering material supply unit
31a, 31b ring seal
33 valve chamber
34 valve chamber head
35a, 35b seat
36 valve chamber core body
36a, 36b counter-seat
37 counter-body/counter-mass
38a, 38b groove
39a, 39b plate spring
40a, 40b, 40c cooling channel/outlet bore
41 locking screws
45 main body
47a, 47b openings
48a, 48b connection opening
49 opening
53 actuator chamber
100 aperture gap
A (central) axis
$A_1$, $A_2$ amplitude/hub
E ejection direction
$M_1$, $M_2$, $M_3$, $M_4$, $M_5$, $M_6$ movement mode
R retraction direction
s path
$s_1$, $s_2$, $s_3$, $s_4$ position
t time
$t_0$, $t_1$, $t_2$, $t_3$, $t_4$, $t_5$, $t_6$ instant
WR effective direction axis

The invention claimed is:

1. Metering valve for the metering of a metering material, comprising:
   a valve chamber, comprising an outlet aperture,
   a closure element arranged in or on the valve chamber,
   a valve chamber casing, and
   an actuator assembly realized to move at least the outlet aperture relative to the valve chamber casing in an ejection direction or a retraction direction during operation such that, in at least one movement mode, metering material is expelled by the closure element through the outlet aperture by a movement of the outlet aperture in the ejection direction,
   wherein the closure element comprises a plunger.

2. Metering valve according to claim 1, wherein the closure element is rigidly fixed to the valve chamber casing.

3. Metering valve according to claim 1, wherein the valve chamber is a two-part entity comprising a valve chamber head arranged in the region of the outlet aperture, and a valve chamber core body.

4. Metering valve according to claim 1, wherein at least one seat is arranged on the valve chamber, and the actuator assembly comprises an actuator, which extends between the seat of the valve chamber and a counter-seat of the valve chamber casing, and is held between the seat and the counter-seat.

5. Metering valve according to claim 1, whereby a counter-seat of the valve chamber casing is arranged on a counter-mass, which in turn is spring-loaded.

6. Metering valve according to claim 1, whereby the valve chamber comprises one opening for a metering material.

7. Metering valve according to claim 1, whereby a valve housing or the valve chamber comprises at least one cooling channel in order to convey a cooling medium for cooling the actuator assembly during operation.

8. Metering valve according to claim 1, wherein the actuator assembly is realized to move the valve chamber relative to the valve chamber casing.

9. Metering valve according to claim 1, wherein the actuator assembly comprises at least one first piezoelectric actuator.

10. Metering valve according to claim 9, whereby the valve chamber is at least partially surrounded by a group of several piezoelectric actuator elements of a piezoelectric actuator, arranged in parallel and acting in parallel.

11. Metering valve according to claim 10, whereby the valve chamber is at least partially surrounded by two groups of actuator elements, whereby the actuator elements of a first group are connected to give a first actuator and the actuator elements of a second group are connected to act as a second actuator.

12. Metering valve according to claim 10, whereby the actuator elements of an actuator are aligned parallel to an effective direction axis and are uniformly arranged about the valve chamber relative to a plane perpendicular to the effective direction axis.

13. Metering valve for the metering of a metering material, comprising:
   a valve chamber, comprising an outlet aperture,
   a closure element arranged in or on the valve chamber,
   a valve chamber casing, and
   an actuator assembly realized to move at least the outlet aperture relative to the valve chamber casing in an ejection direction or a retraction direction during operation such that, in at least one movement mode, metering material is expelled by the closure element through the outlet aperture by a movement of the outlet aperture in the ejection direction,
   wherein the actuator assembly comprises at least two piezoelectric actuators oppositely connected such that a first piezoelectric actuator, when expanded during operation, moves the outlet aperture in the ejection direction, and a second piezoelectric actuator, when expanded during operation, moves the outlet aperture in the retraction direction.

14. Metering valve according to claim 13, whereby the actuators are secured at their outer ends to seats or counter-seats by means of a levelling compound.

15. Method of metering a metering material by means of a metering valve that has an outlet aperture and a closure element arranged in or adjacent to a valve chamber, whereby at least the outlet aperture is moved in an ejection direction or a retraction direction relative to a valve chamber casing during operation, so that metering material is ejected by the closure element through the outlet aperture during a movement of the outlet aperture in the ejection direction in at least one movement mode,
   wherein the closure element comprises a plunger.

16. Metering method according to claim 15, wherein the valve chamber is moved relative to the valve chamber casing during operation.

17. Method of metering a metering material by means of a metering valve that has an outlet aperture and a closure element arranged in or adjacent to a valve chamber, whereby at least the outlet aperture is moved in an ejection direction or a retraction direction relative to a valve chamber casing during operation, so that metering material is ejected by the closure element through the outlet aperture during a movement of the outlet aperture in the ejection direction in at least one movement mode, wherein the actuator assembly, which comprises a first actuator or a second actuator that each comprise at least one piezo-electric actuator element, is controlled in a standby mode such that the first actuator and the second actuator are each charged with 50% of their maximum applicable voltage.

* * * * *